US011852369B2

(12) United States Patent
Lee et al.

(10) Patent No.: US 11,852,369 B2
(45) Date of Patent: Dec. 26, 2023

(54) AIR CLEANER AND METHOD OF CONTROLLING OPERATION OF SAME

(71) Applicant: LG ELECTRONICS INC., Seoul (KR)

(72) Inventors: Deuk Won Lee, Seoul (KR); Min Kyu Oh, Seoul (KR); Dae Woong Kim, Seoul (KR); Bo An Kwon, Seoul (KR); Yang Hwan No, Seoul (KR); Hyun Byung Cha, Seoul (KR); Byung Hoon Park, Seoul (KR); Yu Na Jo, Seoul (KR); Ji Hye Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 250 days.

(21) Appl. No.: 17/389,903

(22) Filed: Jul. 30, 2021

(65) Prior Publication Data
US 2022/0042714 A1 Feb. 10, 2022

(30) Foreign Application Priority Data

Aug. 6, 2020 (KR) .................... 10-2020-0098586
Oct. 29, 2020 (KR) .................... 10-2020-0141890

(51) Int. Cl.
F24F 13/08 (2006.01)
F24F 8/108 (2021.01)
(Continued)

(52) U.S. Cl.
CPC ............ *F24F 13/082* (2013.01); *F24F 8/108* (2021.01); *F24F 13/20* (2013.01); *F24F 13/28* (2013.01);
(Continued)

(58) Field of Classification Search
CPC .......... F24F 13/082; F24F 8/108; F24F 13/20; F24F 13/28; F24F 2013/205; B01D 46/00;
(Continued)

(56) References Cited

U.S. PATENT DOCUMENTS 4,221,576 A * 9/1980 Phillips, Jr. ............ B01D 46/20
55/352
4,826,596 A * 5/1989 Hirs ........................ B01D 29/09
210/402

(Continued)

FOREIGN PATENT DOCUMENTS

EP 0 909 576 4/1999
EP 1 826 493 8/2007
(Continued)

OTHER PUBLICATIONS

European Search Report dated Jan. 4, 2022 issued in EP Application No. 21189977.8.
(Continued)

Primary Examiner — Stephen Hobson
(74) Attorney, Agent, or Firm — KED & Associates LLP

(57) ABSTRACT

An air cleaner is provided that includes: a body housing having an air inlet and a filter discharge outlet; a fan module provided within the body housing; a filter supply module provided within the body housing and configured to provide a filter sheet; a filter transportation module configured to transport the filter sheet from the filter supply module such that the filter sheet passes by the air inlet and is discharged at the filter discharge outlet; and a cutting module configured to cut the filter sheet. The filter transportation module includes: a drive supply roller and a driven supply roller; drive and driven discharge rollers that are positioned a distance apart toward the filter discharge sides, respectively, of the two supply rollers; a first roller drive motor configured (Continued)

to drive the drive supply roller; and a second roller drive motor configured to drive the drive discharge roller.

20 Claims, 35 Drawing Sheets

(51) Int. Cl.
    *F24F 13/20*     (2006.01)
    *F24F 13/28*     (2006.01)
    *F24C 15/20*     (2006.01)
    *B01D 46/00*     (2022.01)
    *B01D 46/46*     (2006.01)
    *B01D 46/08*     (2006.01)

(52) U.S. Cl.
    CPC .............. *B01D 46/00* (2013.01); *B01D 46/08* (2013.01); *B01D 46/46* (2013.01); *F24C 15/2035* (2013.01); *F24F 2013/205* (2013.01); *Y10S 55/35* (2013.01); *Y10T 29/49815* (2015.01)

(58) Field of Classification Search
    CPC .... B01D 46/18; B01D 46/46; B01D 2273/30; F24C 15/2035; F24C 15/20; Y10S 55/35; Y10T 29/49815
    See application file for complete search history.

(56) References Cited

U.S. PATENT DOCUMENTS

| | | | | |
|---|---|---|---|---|
| 4,925,560 A * | 5/1990 | Sorrick | ................ | B01D 39/086 210/387 |
| 6,152,998 A * | 11/2000 | Taylor | .................. | B01D 46/444 96/429 |
| 6,162,286 A | 12/2000 | Hasama et al. | | |
| 6,168,646 B1 * | 1/2001 | Craig | .................... | B01D 46/444 96/429 |
| 6,402,822 B1 * | 6/2002 | Najm | .................... | B01D 46/446 96/429 |
| 6,596,059 B1 * | 7/2003 | Greist | ................... | B01D 46/18 96/417 |
| 6,632,269 B1 * | 10/2003 | Najm | ..................... | B01D 46/20 55/501 |
| 6,843,834 B2 * | 1/2005 | Schumacher | ............ | B60H 3/06 55/354 |
| 7,608,121 B2 * | 10/2009 | Boyer | ..................... | F24F 8/108 55/354 |
| 7,785,382 B2 * | 8/2010 | Morton | ............... | F24C 15/2035 55/354 |
| 8,172,406 B2 * | 5/2012 | Yamagishi | ............. | B01D 46/46 353/57 |
| 8,182,588 B2 * | 5/2012 | Morton | ............... | F24C 15/2035 55/354 |
| 8,404,030 B2 * | 3/2013 | Schumacher | ........ | B01D 46/185 96/429 |
| 8,657,936 B2 * | 2/2014 | Sullivan | ................ | B01D 46/18 96/417 |
| 9,375,669 B2 * | 6/2016 | Spiegel | ................. | B01D 46/22 |
| 10,300,426 B2 * | 5/2019 | Salpietra | ................ | B01D 46/10 |
| 10,780,495 B2 * | 9/2020 | Nakano | .................. | B33Y 10/00 |
| 2004/0069703 A1 * | 4/2004 | Wanni | ..................... | B01D 29/09 210/400 |
| 2005/0150382 A1 * | 7/2005 | Sheehan | ................. | B01D 46/46 96/429 |
| 2007/0204854 A1 * | 9/2007 | Morton | ............... | F24C 15/2035 126/299 D |
| 2010/0319676 A1 * | 12/2010 | Morton | ............... | F24C 15/2035 126/299 D |
| 2012/0055339 A1 * | 3/2012 | Schumacher | ........ | B01D 46/185 55/354 |
| 2019/0321757 A1 | 10/2019 | Jakpor | | |
| 2023/0032171 A1 * | 2/2023 | Eun | .......................... | B04C 9/00 |

FOREIGN PATENT DOCUMENTS

| | | |
|---|---|---|
| JP | S47-50702 | 12/1972 |
| JP | 09-077298 | 3/1997 |
| JP | 2007-298206 | 11/2007 |
| JP | 2013-086250 | 5/2013 |
| KR | 10-2006-0003185 | 1/2006 |
| KR | 10-0582006 | 5/2006 |
| KR | 20-0421961 | 7/2006 |
| KR | 10-2011-0076651 | 7/2011 |
| KR | 10-1411356 | 6/2014 |
| KR | 10-1411356 | 7/2014 |
| KR | 10-1578162 | 12/2015 |
| KR | 20-0484435 | 8/2017 |
| KR | 10-1962730 | 3/2019 |

OTHER PUBLICATIONS

International Search Report dated Oct. 26, 2021 issued in Application No. PCT/KR2021/008563.

* cited by examiner 411,412,421,422

AIR CLEANER AND METHOD OF CONTROLLING OPERATION OF SAME

CROSS-REFERENCE TO RELATED APPLICATIONS

The present application claims priority to Korean Patent Application No. 10-2020-0098586, filed in Korea on Aug. 6, 2020 and No. 10-2020-0141890, filed in Korea on Oct. 29, 2020, the entire contents of which are incorporated herein by reference.

BACKGROUND

1. Field

The present disclosure relates to an air cleaner to clean air containing an oil component and a method of controlling operation of the air cleaner.

2. Background

An air cleaner is an apparatus configured to filter out various materials contained in air. The air cleaner can be provided in various forms according to the purpose thereof. For example, the air cleaner may be a kitchen hood that is used in a kitchen. The kitchen hood performs a function of discharging fumes that occur when cooking food. In addition, a filter is installed in the kitchen hood. The filter filters out various contaminants contained in fumes that are to pass through the hood and to be discharged to the outside. Contaminants such as oil components, odor components, fine particles, harmful gas, and the like may be contained in the fumes.

Accordingly, in disadvantageous arrangements, it may be difficult to remove the oil components absorbed on the filter. Thus, filters with a replacement structure in which a filter is frequently replaced with a new one have been mostly used.

However, these replacement-type filters may have a structure that also requires replacement of a filter frame for supporting and installing a filter. Thus, the replacement-type filters are high-priced.

A user may have difficulty replacing the filter, and may not replace the filter periodically. Thus, the filter may be seriously contaminated.

In order to replace the filter easily and frequently, a structure has been proposed where a filter is wound around a roller and where the roller is rotated manually or automatically.

Filter winding-type replacement structures are disclosed in Korean Utility Model Registration Nos. 20-0271637 and 20-0463975, Korean Patent Application Publication No. 10-2005-0103590, and Korean Patent Nos. 10-1578162 and 10-1962730, the subject matter of which is incorporated herein by reference.

However, when the above-described filter replacement method is employed, the filter wound around the roller (recycling roller) that is used and collected contains contaminants. Thus, the surrounding environment may also be contaminated with odors or contaminated ingredients occurring from contaminants.

The contaminants may be a lot of coagulated oil components. Accordingly, because the used-up sections of the filter containing coagulated oil are enlarged, the recycling roller can not be smoothly operated (rotated).

Accordingly, as disclosed in Korean Patent No. 10-1411356, used-up sections of the filter have been wound around the recycling roller (a second roller) in a state of being combined with paper, non-woven fabric, vinyl, and/or the like. Thus, contaminants contained in the filter may not be discharged to the outside.

After the filter is used up, an operation of automatically replacing one used-up section of the filter may be performed. The one used-up section of the filter may be automatically cut off by a cutting unit and is discharged. Thus, a clean state of the filter can always be maintained.

However, in disadvantageous arrangements, the filter is cut without maintaining firm contact with portions thereof on both sides in a lengthwise direction of the one used-up section of the filter. For this reason, the filter is not maintained in a fully spread-out state. Thus, warping occurs in the direction in which a cutting blade presses against the filter, and thus the filter can not be precisely cut.

That is, a transportation roller may be present in front of the recycling roller, but simply guides the direction of transportation of the filter. Thus, a cutting defect inevitably occurs because a structure for maintaining firm contact with the filter to fully spread out the filter is not employed.

Additionally, in disadvantageous arrangements, used-up sections of the filter are temporarily stored in a state of being wound around the recycling roller. When stored in this manner, the used-up sections of the filter are illuminated with ultraviolet light to remove an insanitary condition. This illumination increases power consumption.

After one used-up section of the filter is discharged, a user may suffer the inconvenience of winding one cut-off section of the filter around the recycling roller using a sheet of overlapping paper.

Because firm contact with a portion (i.e., a portion of the filter) wound around a supply roller is not maintained when cutting the filter, a situation may occur where the portion wound around the filter is deviated from the transportation roller immediately after cutting the filter.

One cut-off section of the filter may be manually caused to pass through a guide and to be wound around the recycling roller. However, because a space for passing through the guide is narrow, a manual operation may be difficult to perform.

Additionally, in disadvantageous arrangements, a filter apparatus including the roller may have a stationary structure and thus is provided in a state of being integrated with the kitchen food. For this reason, there is a disadvantage in that the filter apparatus has limited applications. For example, when cooking food on a dining table, contaminants, such as fumes that occur from the food, may not be removed.

An air cleaner for a dining table that filters out fine particles is disclosed in Korean Patent No. 10-0582006, the subject matter of which is incorporated herein by reference.

However, the air cleaner for a dining table has a disadvantage in that the filter cannot be easily replaced. Furthermore, the contamination of the filter cannot be quickly dealt with.

Moreover, the air cleaner for a dining table has a complex separation or disassembling structure and thus has the inconvenience that maintenance thereof is difficult.

An attachable air cleaner is disclosed in Korean Utility Model Registration No. 20-0484435, the subject matter of which is incorporated herein by reference. However, the attachable air cleaner has the inconvenience that the filter is difficult to clean. Moreover, the attachable air cleaner has a complex separation or disassembling structure and thus has the inconvenience that maintenance thereof is difficult.

More particularly, commonly used air cleaners may have a structure in which frequent replacement of a filter is not possible. This structure may be disadvantageous in removing contaminants containing an oil component occurring when cooking food.

In an example where a filter containing contaminants is wound around the roller (for example, a supply roller, a recycling roller, and/or a transportation roller), a surface of the roller may be stained with the contaminants contained in the filter. The contaminants on the surface of the roller may cause an unsanitary condition and may give off odors. For this reason, the roller may frequently need to be cleaned or washed.

A hood or a roller used in an air cleaner may need to be separated for cleaning. In order to clean the roller, the roller may need to be easily removed from and be reinstalled on a product (the hood, the air cleaner, and/or the like).

However, in most cases, a tool is necessary to remove and reinstall the roller from and on the product, and a job of removing and reinstalling the filter is difficult. The reason for this is that at least one of the rollers in the product receives drive power for rotation and that rollers constituting a pair are required to be installed at regular distance. For this reason, the separating and reinstalling of the roller from and on the product may be a troublesome job.

In order to easily replace a roller of which a surface is damaged, a flange portion may be provided on both ends of a roller body. This flange portion is disclosed in Korean Patent Application Publication No. 10-2011-0076651, the subject matter of which is incorporated herein by reference. That is, a combination protrusion and a combination groove are formed between a flange portion and a roller body, and the flange portion and the roller body can be selectively separated.

However, the combination groove is open at one side in a radial direction of the roller body. Thus, only when the combination groove open at one side is positioned at a specific position, the roller body is in a separable state. It is inconvenient to position the combination groove.

A structure for replacing only a damaged component when a shaft or roller is damaged is disclosed in Korean Utility Model Registration No. 20-0421961, the subject matter of which is incorporated herein by reference. However, this structure requires that the roller and a chuck are combined and separated for replacement using a fastening bolt. A separate tool may be necessary for combining and separating. More particularly, the structure may be difficult to employ for small-sized roller used in a narrow space. The reason for this is that the tool is difficult to use because there are many components in the vicinity of the installed roller.

The foregoing is intended merely to aid in the understanding of the background of the present disclosure, and is not intended to mean that the present disclosure falls within the purview of the related art that is already known to those skilled in the art.

BRIEF DESCRIPTION OF THE DRAWINGS

Arrangements and embodiments may be described in detail with reference to the following drawings in which like reference numerals refer to like elements, and wherein.

DETAILED DESCRIPTION

An air cleaner according to preferred embodiments of the present disclosure may be described with reference to FIGS. 1 to 47. The air cleaner according to the present disclosure, for example, is configured as a product that, although miniaturized in a manner that is movable for installation, is usable independently without being combined with a separately fixed structure.

The air cleaner according to the present disclosure may be used as a portable hood configured to absorb an oil component that occurs when cooking food and to easily discharge one section of a filter sheet on which the oil component is absorbed. The air cleaner according to an embodiment of the present disclosure may be described with reference to the direction illustrated in each drawing figure.

Figure 1:
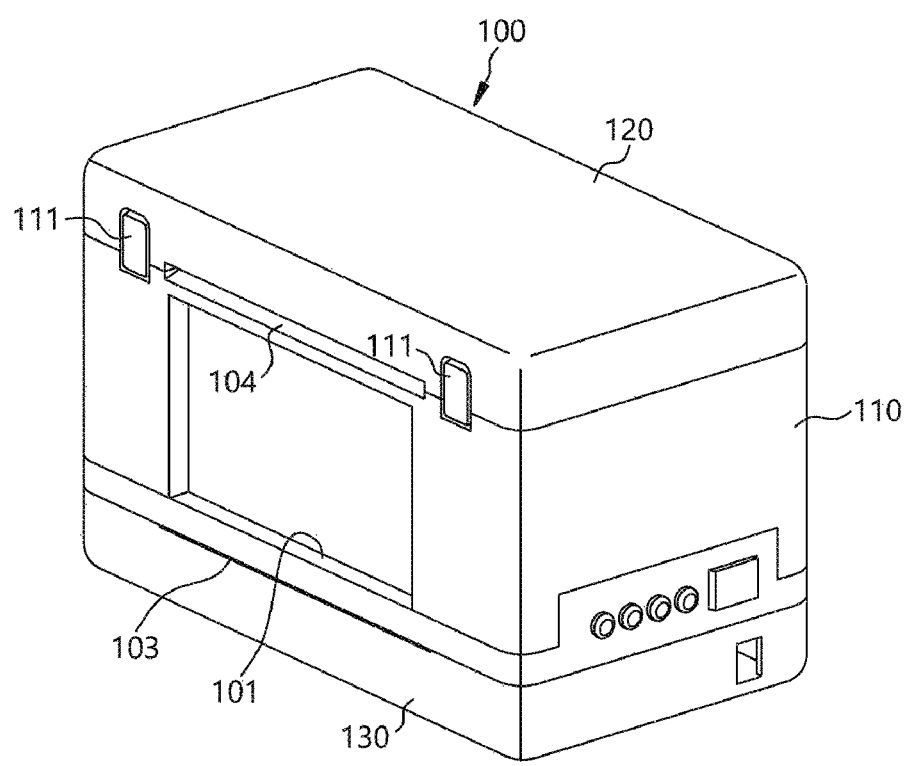
FIG. 1 is a perspective view illustrating a structure of an exterior appearance of an air cleaner according to an embodiment of the present disclosure.
Figure 2:
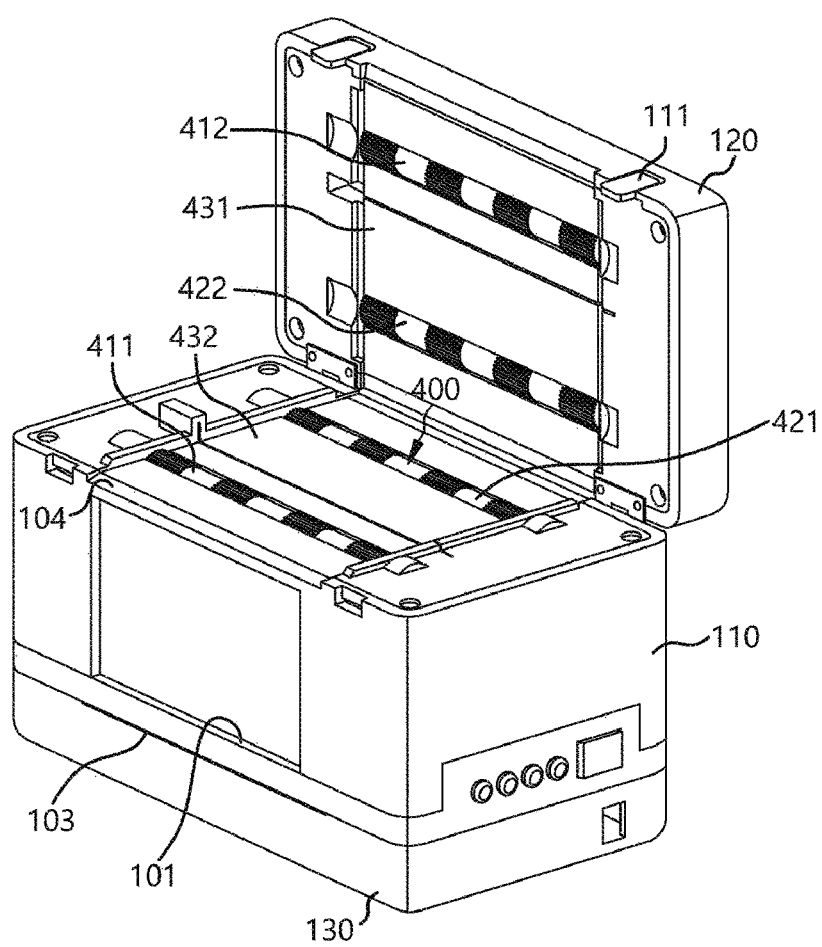
FIG. 2 is a perspective view illustrating a state where an upper covering portion of the air cleaner according to an embodiment of the present disclosure is open.
Figure 3:
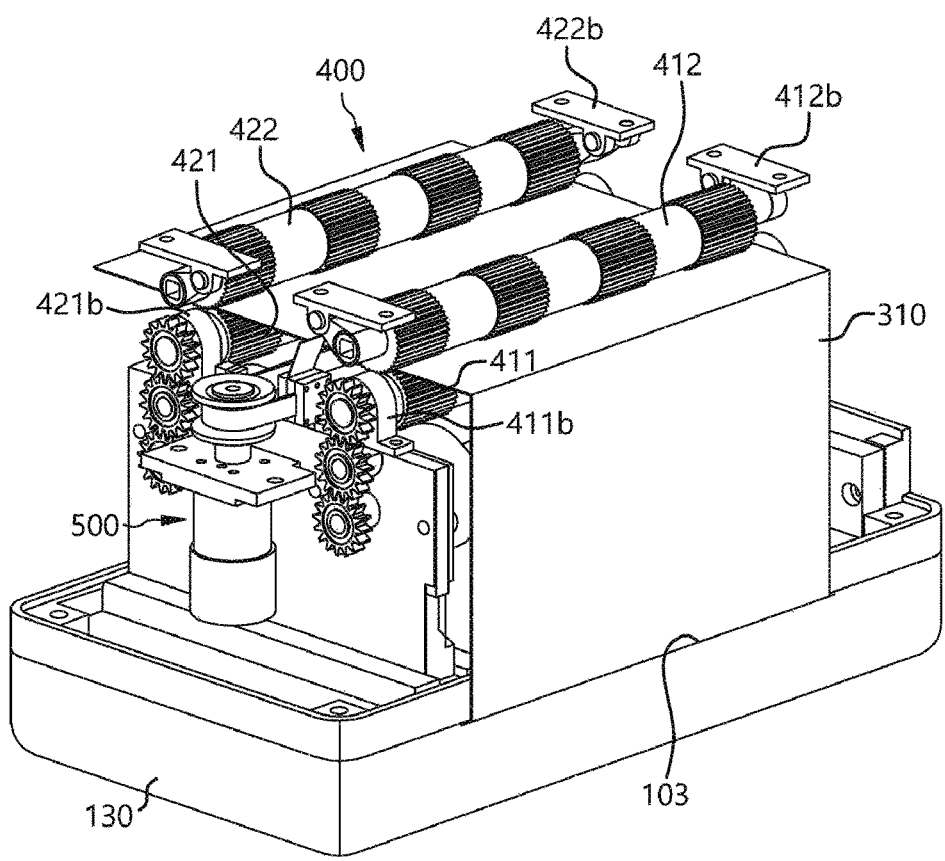
FIG. 3 is a perspective view illustrating a state where the upper covering portion and a body portion are removed from the air cleaner according to an embodiment of the present disclosure.
Figure 4:
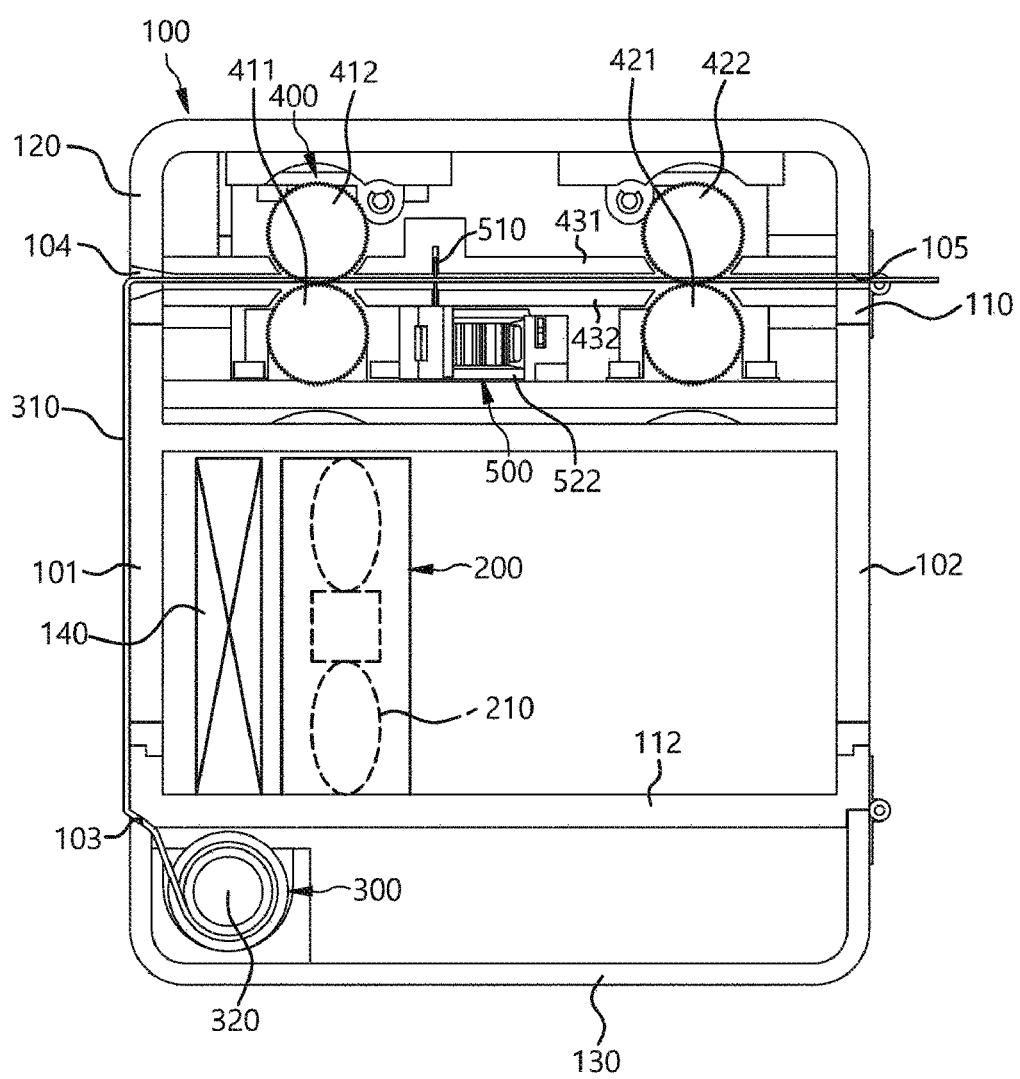
FIG. 4 is a view (when viewed from a first direction) illustrating an internal state of the air cleaner according to an embodiment of the present disclosure.
Figure 5:
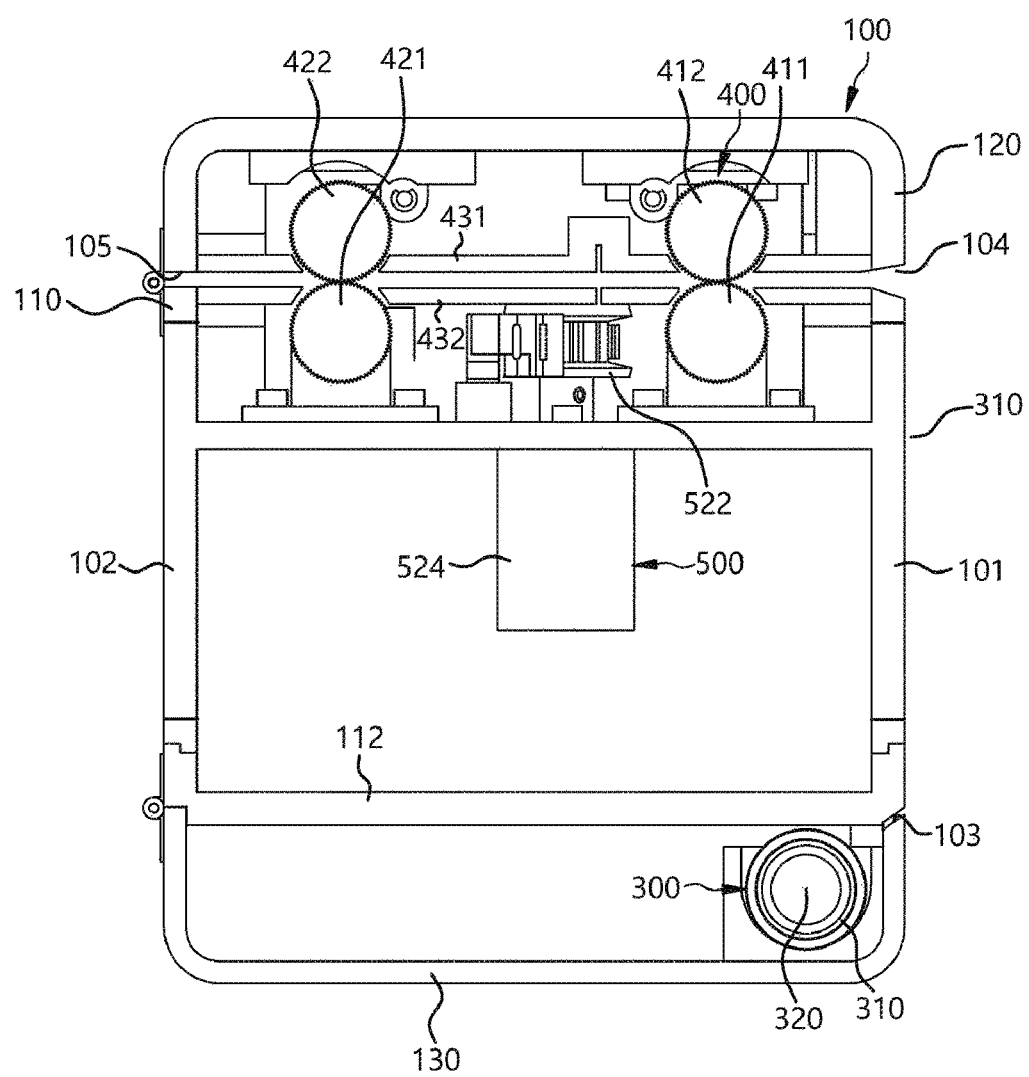
FIG. 5 is a view (when viewed from a second direction) illustrating an internal state of the air cleaner according to an embodiment of the present disclosure.

FIG. 1 is a perspective view (when viewed from a front side) illustrating a structure of an exterior appearance of the air cleaner according to an embodiment of the present disclosure. FIG. 2 is a perspective view illustrating a state where an upper covering portion of the air cleaner is open, according to an embodiment of the present disclosure. FIG. 3 is a perspective view illustrating a state where the upper covering portion and a body portion are removed from the air cleaner according to the embodiment of the present disclosure. FIGS. 4 and 5 are views each illustrating an internal state of the air cleaner.

As shown in FIGS. 1 to 5, the air cleaner may be configured to take in and out air, remove foreign materials contained in the taken-in air, and transport and cut off one section of a filter sheet 310 that filters out foreign materials. Accordingly, the filter sheet 310 may always be kept clean. Each constituent element of the air cleaner may be described as follows. First, the air cleaner may be configured to include a body housing 100. The body housing 100 may form a body of the air cleaner. The body housing 100 may be formed to have a box-like structure. Thus, the body housing 100 may have an installation space inside.

As shown in FIGS. 1, 2, 4, and 5, an air inlet 101 may be formed in a front surface of the body housing 100. The front surface may refer to a wall surface positioned in the direction in which food is cooked or a wall surface positioned in the direction in which air to be cleaned is present.

The air inlet 101 may be formed so as to occupy most portions of the front surface of the body housing 100 or to occupy one or several portions of the front surface of the body housing 100. More specifically, the air inlet 101 may be formed in only a portion including the center, of the front surface of the body housing 100. The air inlet 101 may be formed as a single opening. Alternatively, the air inlet 101 may be formed to have a grill structure that has a slot locally or to have a perforated-plate structure that has a plurality of through-holes.

As shown in FIGS. 1, 2, 4, and 5, an air outlet 102 (through which air is discharged) may be formed in a rear surface of the body housing 100. The air outlet 102 may be formed so as to occupy most portions of the rear surface of the body housing 100 or to occupy one or several portions of the rear surface of the body housing 100. The air outlet 102 may be formed as a single opening. Alternatively, the air outlet 102 may be formed to have a grill structure that has a slot locally or to have a perforated-plate structure that has a plurality of through-holes.

The air outlet 102 may be formed on respective surfaces of both sidewalls of the body housing 100 or may be formed on the rear surface of the body housing 100 and the respective surfaces of both sidewalls thereof.

The body housing 100 may be configured to include a body portion 110 and an upper covering portion 120. The air inlet 101 is formed on the body portion 110. The upper covering portion 120 is provided on an upper surface of the body portion 110.

In this example, at least one of the following may be considered: the air outlet 102 is formed on a rear surface of the body portion 110; the air outlet 102 is formed on both flank surfaces of the body portion 110; and the air outlet 102 is formed on an upper surface of the upper covering portion 120.

As an example, the air outlet 102 may be formed on the rear surface of the body portion 110.

One or several components of a filter transportation module 400 may be provided in the body portion 110, and other components of the filter transportation module 400 may be provided in the upper covering portion 120.

More specifically, a drive supply roller 411 and a drive discharge roller 421 may be provided in the body portion 110, and a driven supply roller 412 and a driven discharge roller 422 may be provided in the upper covering portion 120.

The upper covering portion 120, as shown in FIG. 2, may be installed in a manner that is separable from the body portion 110. That is, the separation of the upper covering portion 120 from the body portion 110 may make internal constituent components of the air cleaner easy to maintain.

The upper covering portion 120 may be configured not only in a manner that is rotatably installed on the main body 110, but also in a manner that is separated from the body portion 110 or combined with the body portion 110.

The upper covering portion 120 and the body portion 110 may be configured to being held in place (with respect to each other) using a locking member 111. The locking member 111 may be configured to have a hook-on and-off structure. The locking member 111 may be configured to have various other locking structures.

As shown in FIGS. 1, 2, 4, and 5, a filter outlet 103 and a filter inlet 104 may be both formed at the front surface of the body housing 100.

The filter outlet 103 is an outlet through which the filter sheet 310 (of a filter supply module 300) is pulled out from within the body housing 100 to the outside of the body housing 100. The filter outlet 103 is formed below the air inlet 101.

The filter inlet 104 is an inlet through which the filter sheet 310 that is pulled out to the outside of the body housing 100 through the filter outlet 103 and thus blocks the air inlet 101 is being inserted back into the body housing 100. The filter inlet 104 may be formed above the air inlet 101. The filter sheet 310 may be pulled out from a lower portion of the front surface of the body housing 100, the filter sheet may block the air inlet 101, and then the filter sheet 310 may be pulled back into the front surface of the body housing 100.

The filter inlet 104 may be formed in a portion of the front surface of the body housing 100 at which the upper covering portion 120 and the body portion 110 form a border line. That is, one portion of the filter inlet 104 may be formed by indenting (in an upward direction) a front portion of a lower surface of the upper covering portion 120, and the other portion of the filter inlet 104 may be formed by indenting (in a downward direction) a front portion of the upper surface of the body portion 110. Accordingly, the upper covering portion 120 and the body portion 110 form the filter inlet 104 when brought into contact with each other.

Moreover, the filter inlet 104 may be formed in an inclined or rounded manner so that the nearer a front end thereof is, the greater a width thereof. That is, this tapered-hole structure of the filter inlet 104 may make initial insertion of the filter sheet 310 easy.

The filter inlet 104 may be formed in such a manner that an upper edge thereof (i.e., a front edge of the upper surface of the body portion 110) is more inclined or rounded than a lower edge thereof (a front edge of a lower surface of the upper covering portion 120). This structure may remove a phenomenon where the lower edge of the filter inlet 104 presses against the filter sheet 310 with excessive pressure when the filter sheet 310 is bent at a sharp angle, and thus may prevent the filter sheet 310 from being torn and damaged.

The filter outlet 103 may be formed in a manner that is inclined upward or rounded. Accordingly, the filter outlet 103 may be positioned maximally adjacent to the air inlet 101 and thus may reduce usage of the filter sheet 310. The filter sheet 310 may be prevented from being torn and damaged due to the excessive pressure resulting from sharp-angle bending of the filter sheet 310.

A filter discharge outlet 105 may be formed in the rear surface of the body housing 100. One section of the filter sheet 310, which no longer carries out an intended function thereof and thus is cut off, is discharged through the filter discharge outlet 105.

The filter discharge outlet 105 may be configured to be disposed at a same height as the filter inlet 104. Depending on an arranged state of the filter transportation module 400, the filter discharge outlet 105 may be formed at a higher position than the filter inlet 104 or may be formed at a lower position than the filter inlet 104.

The body housing 100 may further include a lower covering portion 130. The lower covering portion 130 may be provided underneath the body portion 110, and the filter supply module 300 may be provided within the lower covering portion 130. The lower covering portion 130 may be separably installed on (or at) a lower surface of the body portion 110.

More specifically, the lower covering portion 130 may be configured not only in a manner that is rotatably installed on the body portion 110, but also in a manner that is separated from the body portion 110 or combined with the body portion 110. In this example, the filter outlet 103 to be formed in the body housing 100 may be formed in a portion of the front surface of the body housing 100 at which the lower covering portion 130 and the body portion 110 form a border line.

The lower covering portion 130 and the body portion 110 may be formed in such a manner to close spaces in each other. That is, a bottom portion 112 may be configured to serve as a lower surface of the body portion 110. The lower covering portion 130 may be formed not only in a manner that is open at the top, but also may be installed in a manner that is brought into contact with and mounted on a lower surface of the bottom portion 112 of the body portion 110. This configuration is shown in FIGS. 4 and 5.

A separate external casing may further be provided to the outside of the body housing 100. That is, the body housing 100 may present an exterior appearance of the air cleaner, but may also provide a separate external casing that presents the outward appearance thereof.

For example, the external casing may be formed to surround the entire body housing 100. An inlet grill corresponding to the air inlet 101 and an outlet grill corresponding to the air outlet 102 may be provided in the external casing.

As another example, the external casing may be formed to surround the outside of the body portion 110 (of the body housing 100), and the upper covering portion 120 and/or the lower covering portion 130 may be formed in a manner that is separable/combinable from and with the external casing. The inlet grill and the outlet grill may be provided in the external casing.

A fan module 200 may now be described. The air cleaner according to an embodiment of the present disclosure may be configured to include the fan module 200. The fan module 200 is a module that drives a current of air in order to forcibly take in air through the air inlet 101, and that discharges the air through the air outlet 102. The fan module 200 may be provided within the body portion 110 (of the body housing 100). More specifically, as shown in FIG. 4, the fan module 200 may be positioned behind the air inlet 101 and may be configured such that air is taken in through the air inlet 101.

The fan module 200 may be configured to include a fan 210. In this example, the fan 210 may be an axial fan or a cross flow fan, such as a sirocco fan according to a flow structure for air flow.

A filter unit 140 may be provided within the body portion 110 constituting the body housing 100. A filter for filtering out odor components or fine particles may be provided to the filter unit 140. That is, the filter sheet 310 may be configured to filter out an oil component and large-sized particles, and the filter unit 140 may be configured to filter out an odor component or fine particles.

The filter unit 140 may be positioned in the body portion between the air inlet 101 and the air outlet 102.

As shown in FIG. 4, the filter unit 140 may be positioned between the air inlet 101 and the fan module 200.

The filter unit 140 may be positioned between the fan module 200 and the air outlet 102. However, in an example where the fan module 200 is configured such that fine particles (not filtered out by the filter sheet 310) may be allowed to pass through before the fine particles are completely filtered out, the fan module 200 may be damaged. When this problem is considered, the filter unit 140 may be positioned in front of the fan module 200.

The filter supply module 300 may now be described. The air cleaner according to an example embodiment may be configured to include the filter supply module 300. The filter supply module 300 is a module to supply the filter sheet 310. The filter sheet 310 may be a filter made of paper or non-woven fabric, and preferably may be a filter capable of filtering out the oil component.

The filter supply module 300 may be positioned below the air inlet 101. More specifically, the filter supply module 300 may be provided only within the lower covering portion 130 constituting the body housing 100, but also may be configured such that the filter sheet 310 is pulled out through the filter outlet 103.

Figure 6:
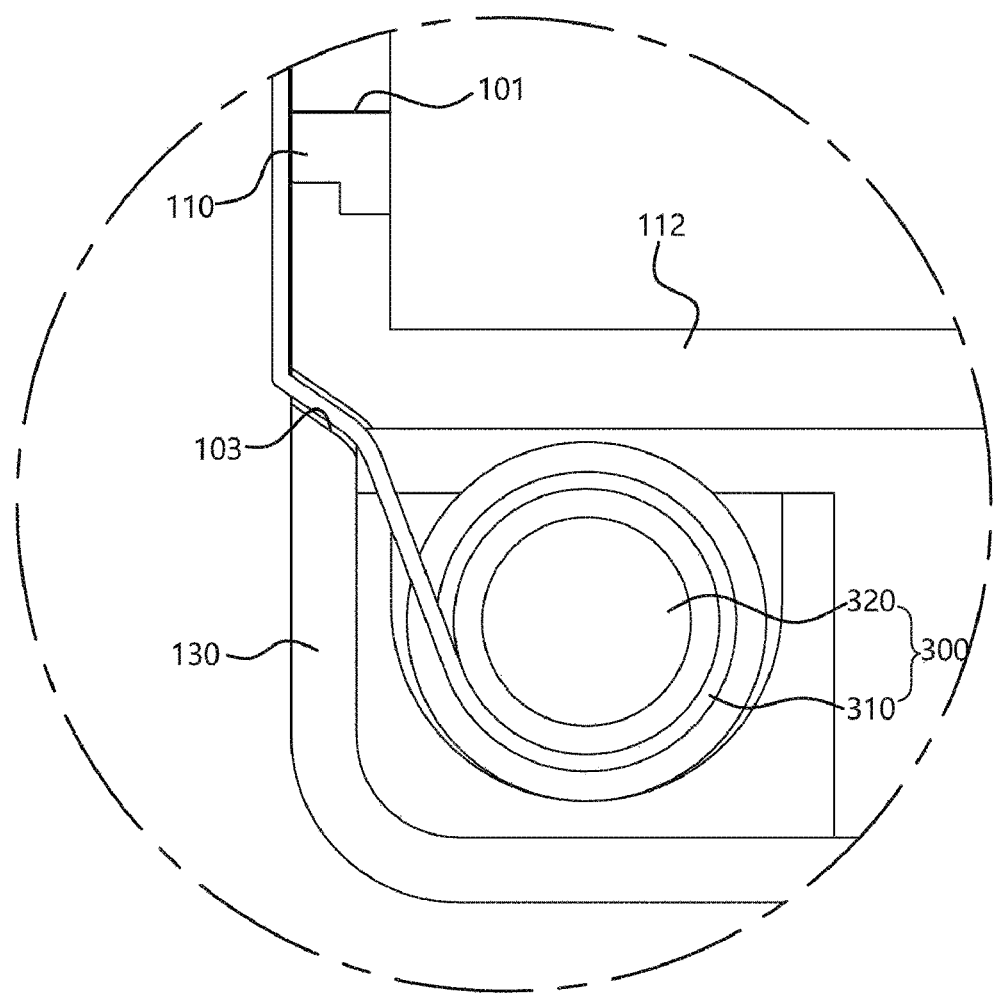
FIG. 6 is an enlarged essential-component view illustrating a state where a filter supply module of the air cleaner is installed.

More preferably, the filter supply module 300, as shown in FIGS. 4 to 6, may be positioned in a front portion of a space in the lower covering portion 130 in such a manner that a distance over which the filter sheet 310 is unwound off is minimized and that the usage of the filter sheet 310 may thus be reduced.

The filter supply module 300 may include a sheet-winding roller 320. The sheet-winding roller 320 may be installed within the lower covering portion 130 constituting the body housing 100 such that both end portions thereof are rotatable. The sheet-winding roller 320 may be provided in a state where the filter sheet 310 is wound around the sheet-winding roller 320.

The filter transportation module 400 may now be described. The air cleaner according to an example embodiment may be configured to include the filter transportation module 400. The filter transportation module 400 is a module that forcibly transports the filter sheet 310 to block the air inlet 101.

The filter transportation module 400 may be positioned above the air inlet 101. That is, the filter transportation module 400 may be configured to pull the filter sheet 310 in order for one corresponding section of the filter sheet 310 to block the air inlet 101.

Figure 7:
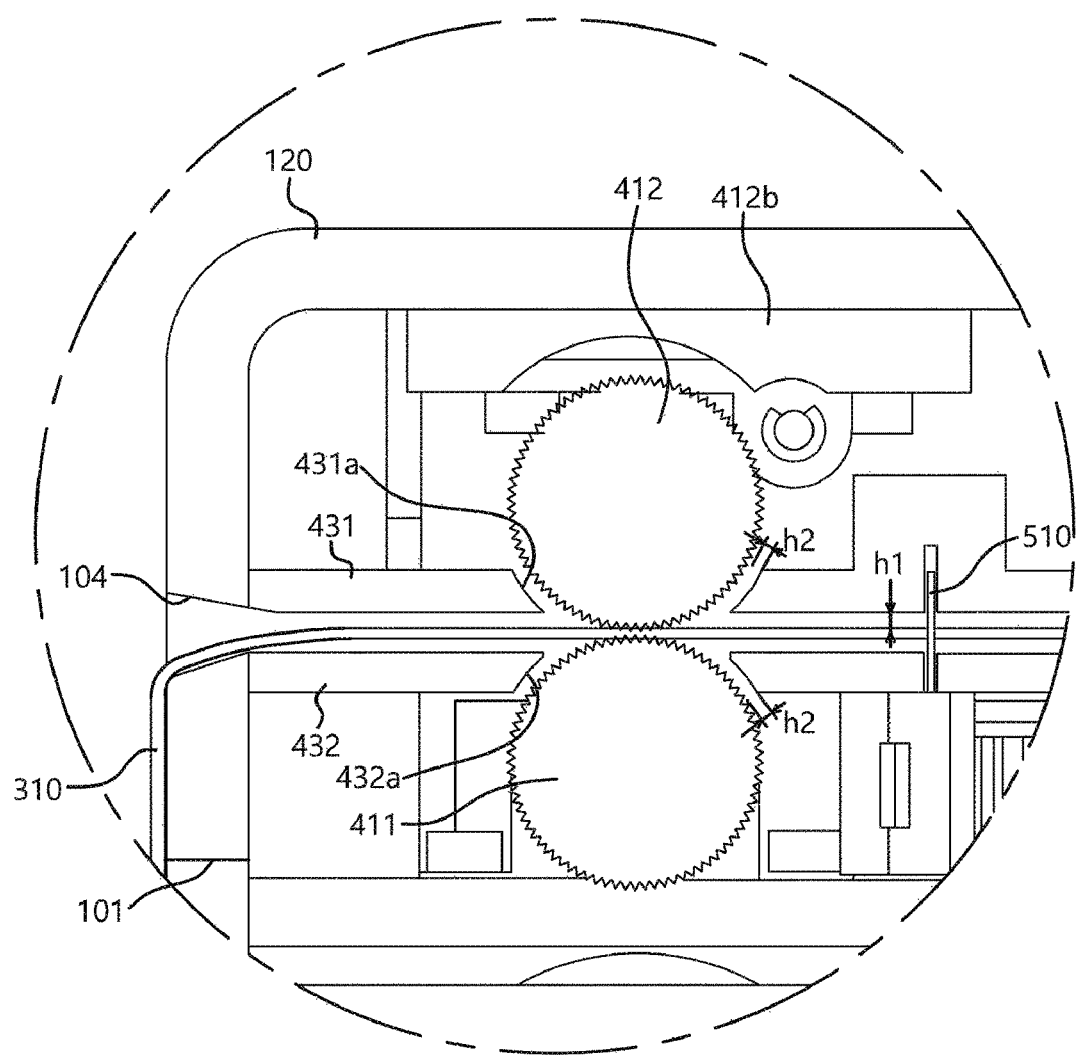
FIG. 7 is an enlarged essential-component view illustrating a state where each supply roller of the air cleaner is installed.
Figure 8:
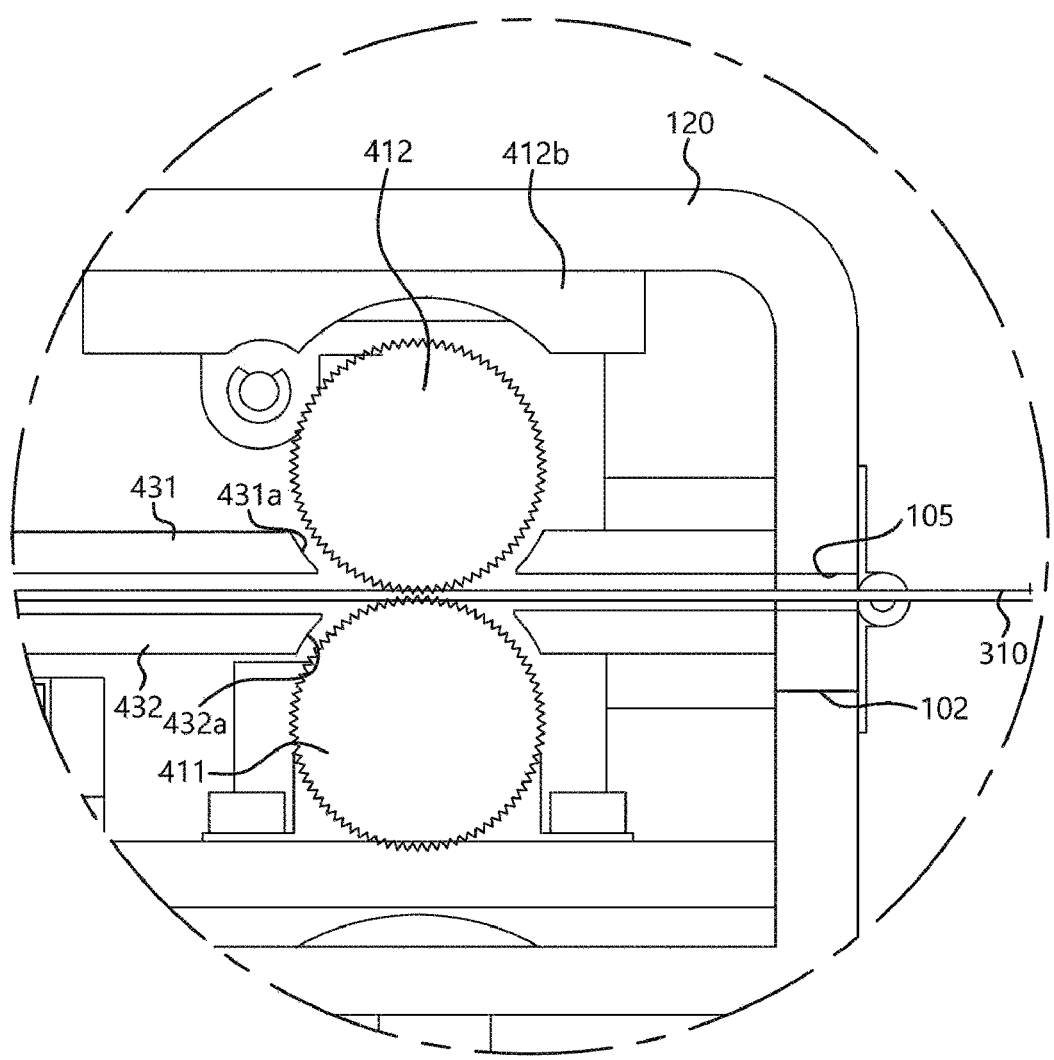
FIG. 8 is an enlarged essential-component view illustrating a state where each discharge roller of the air cleaner is installed.
Figure 9:
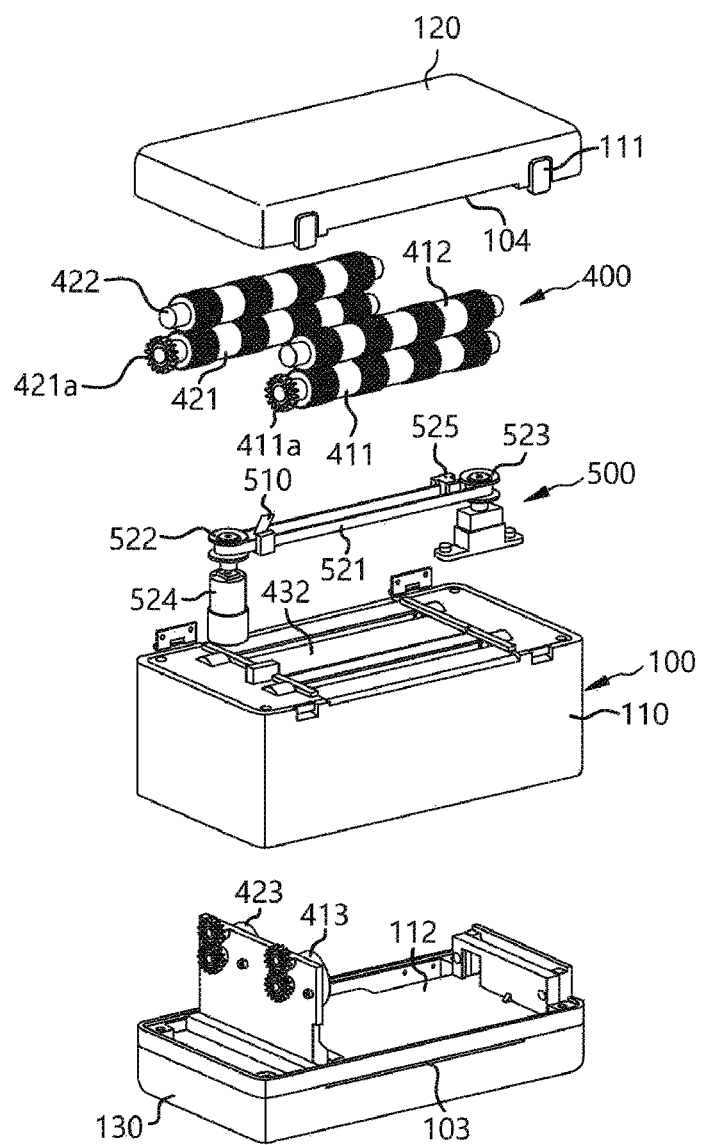
FIG. 9 is an exploded perspective view (when viewed from a first direction) illustrating a state where each constituent element of the air cleaner according to an embodiment of the present disclosure is exploded.
Figure 10:
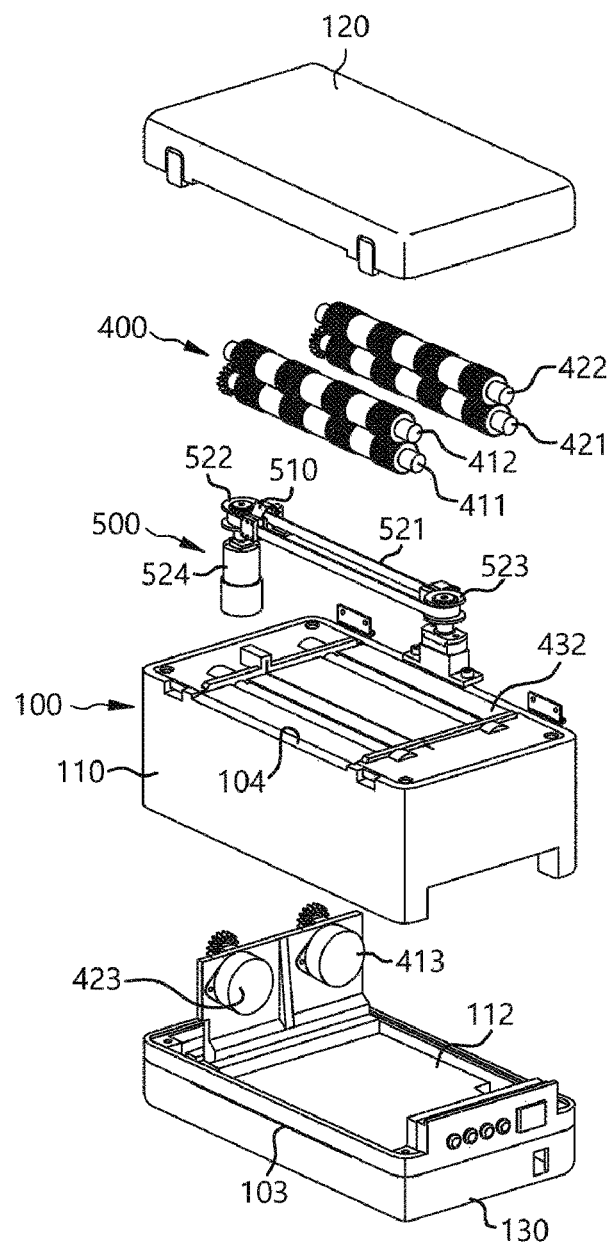
FIG. 10 is an exploded perspective view (when viewed from a second direction) illustrating the state where each constituent element of the air cleaner according to an embodiment of the present disclosure is exploded.
Figure 11:
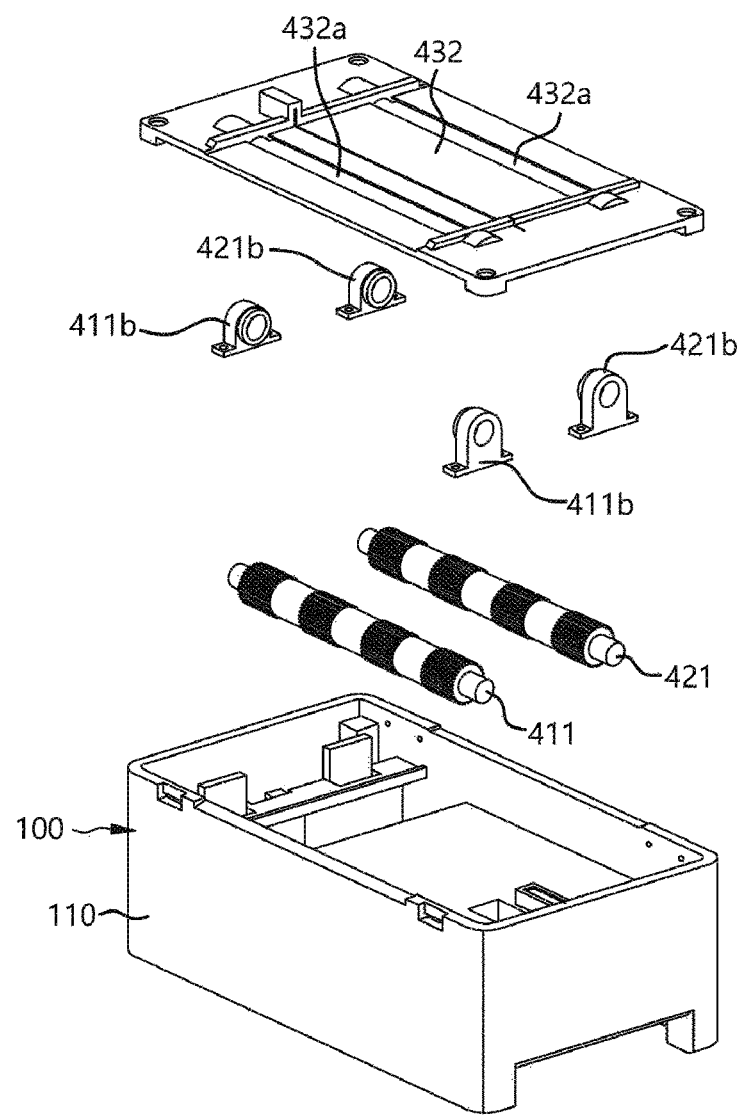
FIG. 11 is an exploded perspective view illustrating a state where drive rollers of an air cleaner according to an embodiment of the present disclosure are installed.
Figure 12:
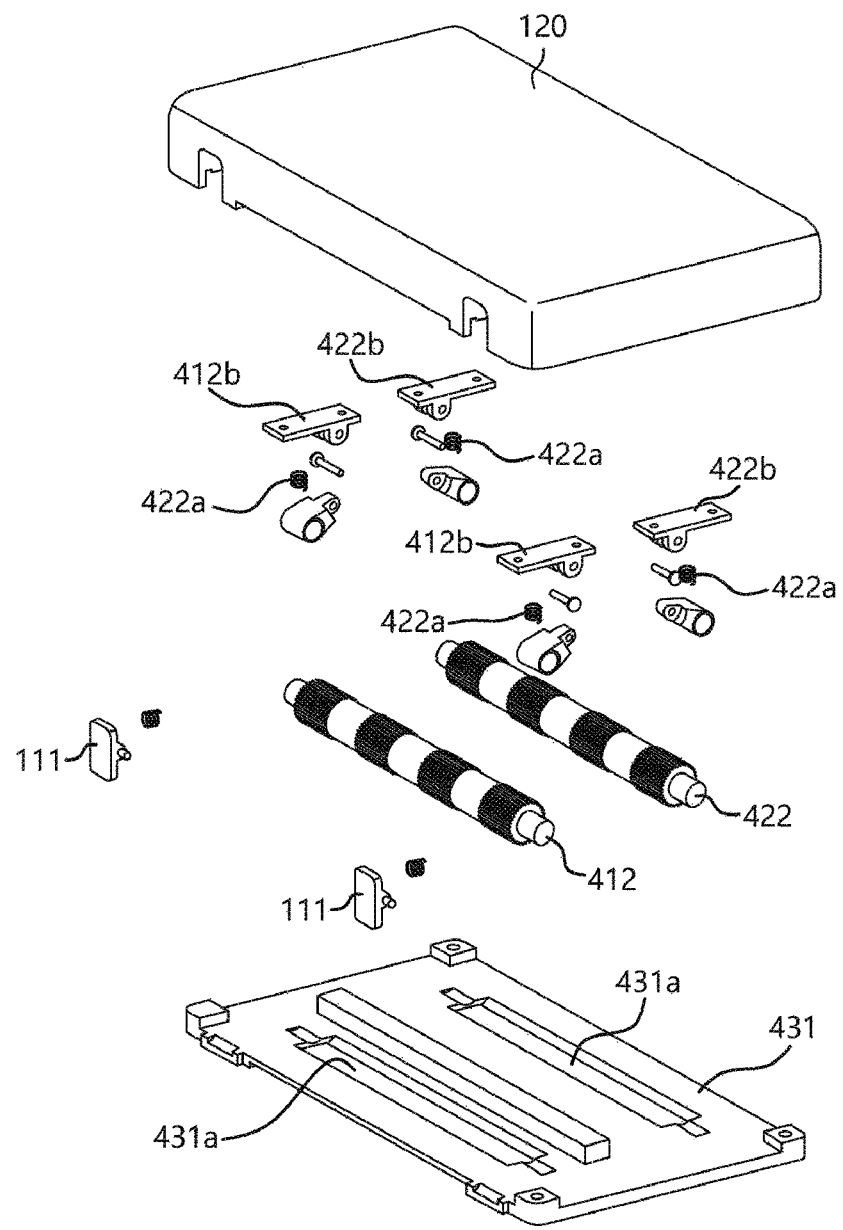
FIG. 12 is an exploded perspective view illustrating the state where the driven rollers of the air cleaner according to an embodiment of the present disclosure are installed.
Figure 13:
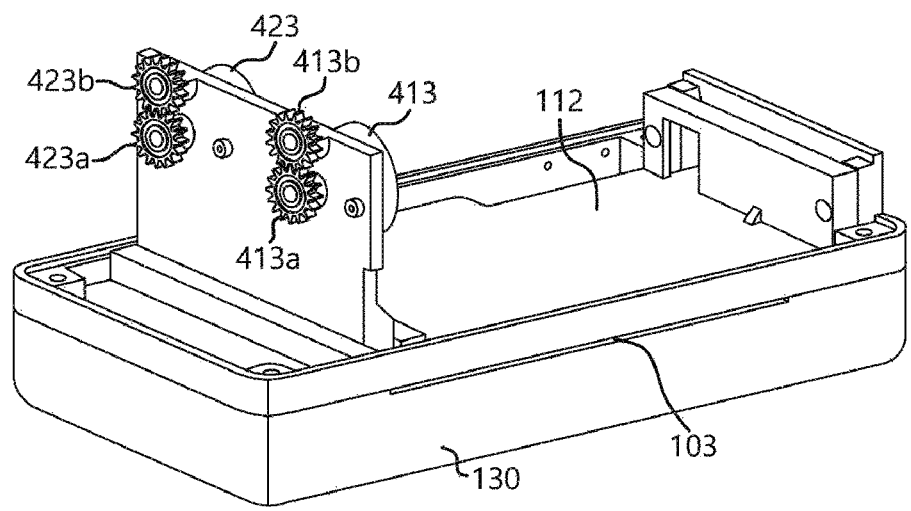
FIG. 13 is a perspective view (when viewed from a first direction) illustrating drive power transfer structures of the drive rollers of the air cleaner according to an embodiment of the present disclosure.
Figure 14:
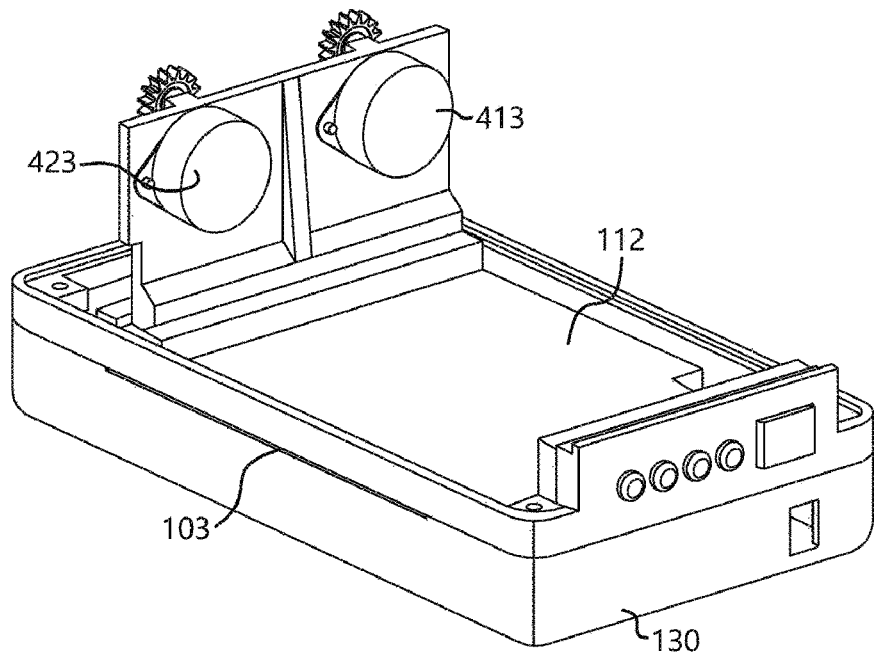
FIG. 14 is a perspective view (when viewed from a second direction) illustrating the drive power transfer structures of the drive rollers of an air cleaner according to an embodiment of the present disclosure.

FIG. 7 illustrates a state where each supply roller of the air cleaner is installed. FIG. 8 illustrates a state where each discharge roller of the air cleaner is installed. FIGS. 9 to 12 each illustrate a state necessary for installing each roller.

As shown in FIGS. 9 to 12, the filter transportation module 400 may be configured to include the drive supply roller 411 and the driven supply roller 412 that are arranged so as to face each other in the downward-forward direction. That is, with operation of each of the drive supply roller 411 and the driven supply roller 412, the filter sheet 310 may be arranged at a position for blocking the air inlet 101.

The drive supply roller 411 may be positioned adjacent to a rear portion of the filter inlet 104 within the body portion 110. Both end portions of the drive supply roller 411 may be rotatably installed on two support guides 411*b* positioned on both lateral portions, respectively, within the body portion 110.

The drive supply roller 411 may be configured to be rotatable with drive power of a first roller drive motor 413 that is received through a first drive power transfer member 411*a*/413*a*/413*b*.

The first drive power transfer member 411*a*/413*a*/413*b* may include a driven gear 411*a* and a drive gear 413*a*, a connection gear 413*b*, or the driven gear 411*a*, the drive gear 413*a*, and the connection gear 413*b*.

That is, the driven gear 411*a* is installed on one end portion of the drive supply roller 411, and the drive gear 413*a* is installed on a motor shaft of the first roller drive motor 413. The drive gear 413*a* and the driven gear 411*a* may be configured to operate in an engaged manner or may operate in conjunction with each other through the connection gear 413*b* that is additionally provided.

The drive supply roller 411 and the first roller drive motor 413 may be connected to each other so as to transfer a drive power using a belt (for example, a timing belt).

The first roller drive motor 413 may be configured as a DC motor capable of being rotated a predetermined number of times.

The driven supply roller 412 is configured such that the driven supply roller 412 is rotated together with the drive supply roller 411 by the rotation thereof.

The driven supply roller 412 may be provided within the upper covering portion 120, and both end portions thereof are installed on two support guides 412*b* positioned on both lateral portions, respectively, within the upper covering portion 120.

More specifically, the driven supply roller 412 may be positioned over the drive supply roller 411 and may be arranged such that faces the drive supply roller 411 in the upward-downward direction with the filter sheet 310 in between.

The driven supply roller 412 may be installed to elastically move upward and downward by an elastic member 412*a*. That is, by a pressing pressure of predetermined magnitude or greater, the driven supply roller 412 is brought into contact with the drive supply roller 411. For this reason, although the driven supply roller 412 is not driven by a separate drive source, the filter sheet 310 may be forcibly transported by drive power of the drive supply roller 411 along with the drive supply roller 411.

In an example where the filter sheet 310 is not present between the drive supply roller 411 and the driven supply roller 412, the two supply rollers 411 and 412 may be kept in contact with each other.

The filter transportation module 400 may be configured to include the drive discharge roller 421 and the driven discharge roller 422 that are arranged so as to face each other in the upward-downward direction for the discharging of one cut-off section of the filter sheet 310.

The drive discharge roller 421 and the driven discharge roller 422 may be positioned toward respective filter taking-out sides, respectively, of the drive supply roller 411 and the driven supply roller 412.

That is, with operation of each of the drive discharge roller 421 and the driven discharge roller 422, the filter sheet 310 may be positioned at a position for blocking the air inlet 101. The filter sheet 310 may be kept flat when cut. One cut-off section of the filter sheet 310 may be discharged to the outside.

The drive discharge roller 421 may be configured to be rotatable with drive power of a second roller drive motor 423 that is received through a second drive power transfer member 421*a*/423*a*/423*b*.

In this example, both end portions of the drive discharge roller 421 may be rotatably installed on two support guides 113*b* positioned on both lateral portions, respectively, within the body portion 110.

The second drive power transfer member 421*a*/423*a*/423*b* may include a driven gear 421*a* and a drive gear 423*a*, a connection gear 423*b*, or the driven gear 421*a*, the drive gear 423*a*, and the connection gear 423*b*.

That is, the driven gear 421*a* may be installed on one end portion of the drive discharge roller 421, and the drive gear 423*a* may be installed on a motor shaft of the second roller drive motor 423. The drive gear 423*a* and the driven gear 421*a* may be configured to operate in an engaged manner or may operate in conjunction with each other through the connection gear 423*b* that is additionally provided.

The drive discharge roller 421 and the second roller drive motor 423 may be connected to each other so as to transfer drive power using a belt (for example, a timing belt).

The driven discharge roller 422 is configured such that the driven discharge roller 422 is rotated together with the drive discharge roller 421 by the rotation thereof.

The driven discharge roller 422 may be provided within the upper covering portion 120, and both end portions thereof are installed on two support guides 422*b* positioned on both lateral portions, respectively, within the body portion 110.

The driven discharge roller 422 may be positioned over the drive discharge roller 421 and may be arranged in a manner that faces the drive discharge roller 421 in the upward-downward direction with the filter sheet 310 in between.

The driven discharge roller 422 may be installed in a manner that is elastically moved upward and downward by an elastic member 421*a*. That is, by a pressing pressure of predetermined magnitude or greater, the driven discharge roller 422 is brought into contact with the drive discharge roller 421. For this reason, although the driven discharge roller 422 is not driven by a separate drive source, the filter sheet 310 may be forcibly transported by drive power of the drive discharge roller 421 along with the drive discharge roller 421.

In an example where the filter sheet 310 is not present between the drive discharge roller 421 and the driven discharge roller 422, the two discharge rollers 421 and 422 may be kept in contact with each other.

The filter transportation module 400 may include an upper guide plate 431 and a lower guide plate 432 that guide transportation of the filter sheet 310. That is, the filter sheet 310 is made to be transported between the upper guide plate 431 and the lower guide plate 432, and thus deformation, such as slackening or warping, may be prevented from occurring while the filter sheet 310 is transported.

Roller through-holes 431*a* and 432*a* may be formed in the guide plates 431 and 432, respectively, such that the rollers 411, 412, 421, and 422 are exposed.

Accordingly, the drive supply roller 411 and the drive discharge roller 421 may be positioned such that respective portions thereof pass through the roller through-hole 432*a* in the lower guide plate 432 and are exposed in the upward direction. Further, the driven supply roller 412 and the driven discharge roller 422 may be positioned such that respective portions thereof pass through the roller through-hole 431*a* in the upper guide plate 431 and are exposed in the upward direction.

As shown in FIG. 7, it is desirable that a separation distance h1 is set to be much greater than a gap distance h2 between the roller through-hole 431*a* and each of the rollers (the driven supply roller 412 and the driven discharge roller 422) that pass through the roller through-hole 431*a*, and the gap distance between the roller through-hole 432*a* and each of the rollers (the drive supply roller 411 and the drive discharge roller 421) that pass through the roller through-hole 432*a*.

That is, if the separation distance h1 is equal to or smaller than the gap distance h2, the filter sheet 310 may be stuck between the two guide plates 431 and 432 and thus may be twisted or bent. In order to prevent this problem, it is desirable that the separation distance h1 is greater than the gap distance h2.

When the gap distance h2 is set to be extremely small, the filter sheet 310 may be less frequently stuck or trapped. However, when the gap distance h2 is set to be excessively small, it may be difficult to ensure that the rollers 411, 412, 421, and 422 are smoothly rotated. Although the gap distance h2 is small, there is still a concern in that a phenomenon where an edge portion of the filter sheet 310 is trapped and bent occurs.

When considering these phenomenon, it is most desirable that the separation distance h1 between the two guide plates 431 and 432 is set to be much greater than the gap distance h2 between the roller through-hole 431*a* and each of the driven supply roller 412 and the driven discharge roller 422, and the gap distance between the roller through-hole 432*a* and each of the drive supply roller 411 and the drive discharge roller 421.

In an example where the air cleaner is used when cooking food, an oil component occurring from the food may be filtered out by the filter sheet 310. Thus, a lot of oil components in a coagulated state may be present on a surface of one corresponding section of the filter sheet 310.

As a result, in a process of transporting one used-up section of the filter sheet 310, a phenomenon may occur where the rollers (411, 412, 421, and 422) slide due to the oil components present in the surface of the one used-up section of the filter sheet 310. Thus, the filter sheet 310 is not smoothly transported.

Accordingly, concave-convex portions 405 maintaining firm contact with the filter sheet 310 may be formed on an external circumferential surface of at least one of the supply rollers 411 and 412 constituting the filter transportation module 400.

That is, the concave-convex portions 405 are formed on the external circumferential surface of the supply roller 411 or 412, and thus the concave-convex portion 405 may be stuck into a surface of the filter sheet 310. Accordingly, one corresponding section of the filter sheet 310 may be smoothly transported without sliding. When the filter sheet 310 is cut, it is possible to pull both sides of the one corresponding section of the filter sheet 310 to flatten a corresponding cutting portion of the filter sheet 310.

The concave-convex portion 405 may be formed to have a serrated structure. That is, since the concave-convex portion 405 having the serrated structure is provided, the filter sheet 310 passing between the rollers 411 and 412 may be forcibly transported in a state of being engaged with the concave-convex portion 405.

The concave-convex portion 405 may be formed to have a cross-section with a sawtooth structure, a toothed gear structure, and/or one of various other polygonal structures.

The concave-convex portion 405 may be formed around the entire supply roller 411 and the entire supply roller 412. However, in an example where the supply rollers 411 and 412 are formed using injection molding, the concave-convex portion 405 may cause the form-removing difficulty, defective forming, and/or the like.

When considering these problems, it may be more desirable that the concave-convex portion 405 is locally formed on a portion of each of the supply rollers 411 and 412. That is, although the concave-convex portion 405 is formed on only a portion of each of the supply rollers 411 and 412, forcible transportation of the filter sheet 310 is possible with the concave-convex portion 405. Thus, when considering the above-described problems, it is more desirable that the concave-convex portion 405 is formed on a portion of each of the supply rollers 411 and 412.

Figure 15:
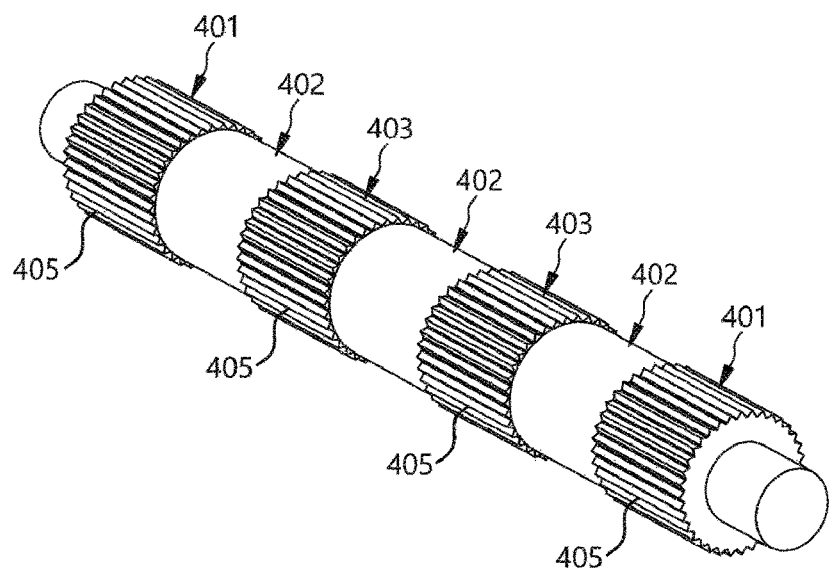
FIG. 15 is a perspective view illustrating a structure of each roller of an air cleaner according to an embodiment of the present disclosure.
Figure 16:
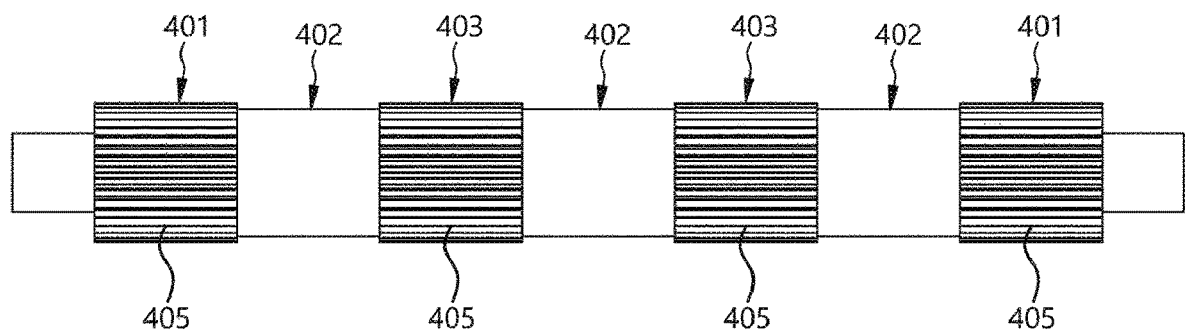
FIG. 16 is a front view illustrating the structure of each roller of an air cleaner according to an embodiment of the present disclosure.
Figure 17:
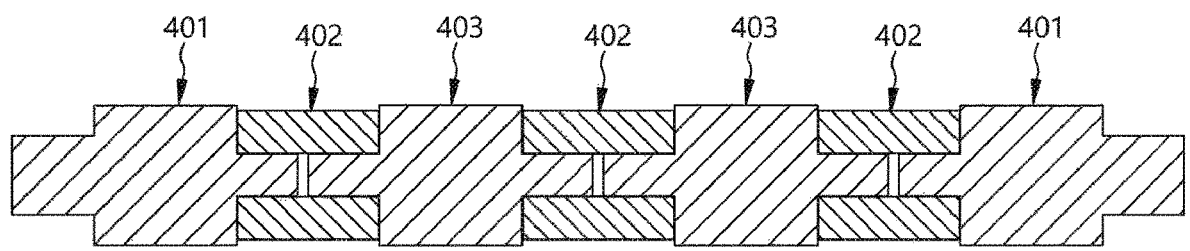
FIG. 17 is a cross-sectional view illustrating an example of a combination structure of each roller of an air cleaner according to an embodiment of the present disclosure.
Figure 18:
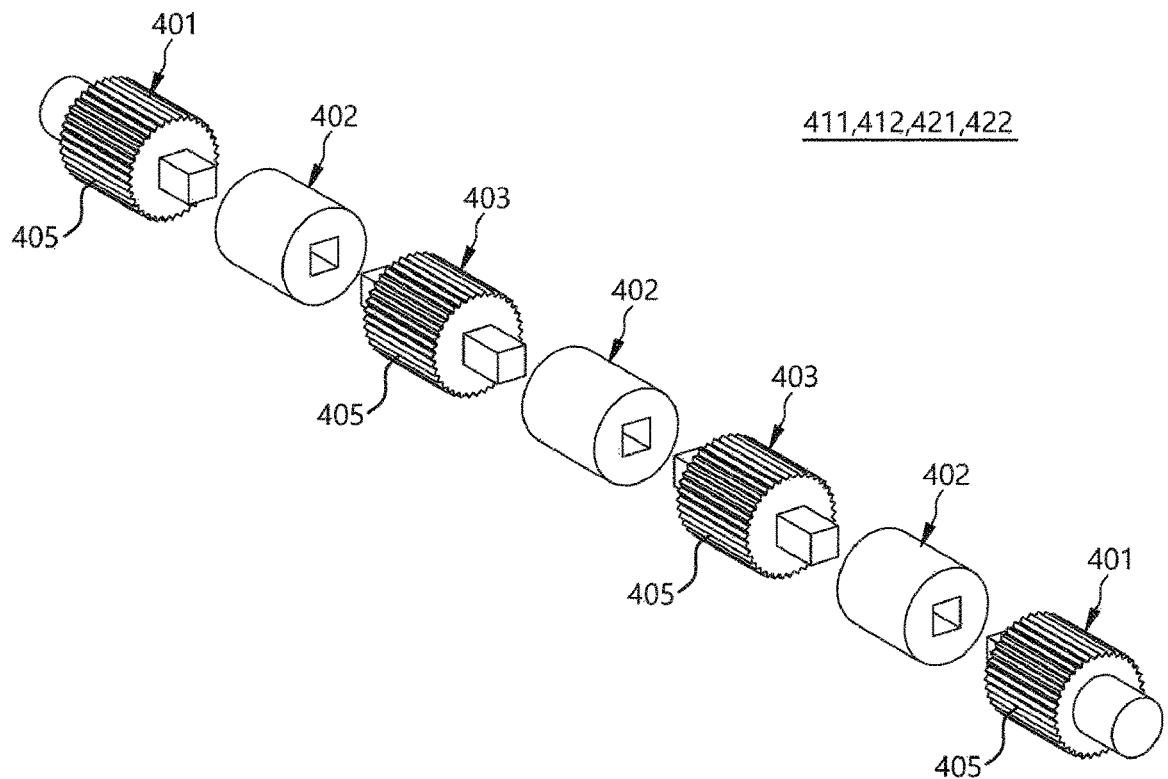
FIG. 18 is a cross-sectional view illustrating another example of the combination structure of each roller of an air cleaner according to an embodiment of the present disclosure.

According to an example embodiment of the present disclosure, as shown in FIGS. 15 and 16, each of the supply rollers 411 and 412 may be configured to include a first roller portion 401 on which the concave-convex portion 405 is provided and a second roller portion 402 on which the concave-convex portion 405 is not provided.

Two first roller portions 401 may be positioned on both end portions, respectively, of the filter sheet 310. Thus, both end portions of the filter sheet 310 may be precisely transported with the two first roller portions 401 positioned on both end portions, respectively, of the filter sheet 310 and at least one second roller portion 402 positioned inward from the two first roller portions 401. Further, the filter sheet 310 may be prevented from swinging during the transportation.

The first roller portion 401 and the second roller portion 402 may be formed in a separable manner. That is, the first roller portion 401 and the second roller portion 402 may be formed in such a manner as to be independently used for assembling. Thus, the first roller portion 401 and the second roller portion 402 may be differently arranged according to size of the filter sheet 310, and may be used in a shared manner regardless of the size of the filter sheet 310.

The first roller portion 401 and the second roller portion 402 may be combined with each other in a bolt and nut manner and may be formed so as to be combined with each other in a manner that is inserted for assembling. These combinations may be shown in FIGS. 17 and 18.

Figure 19:
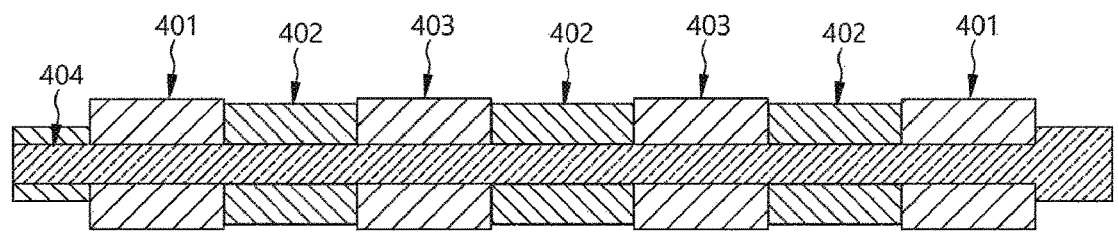
FIG. 19 is a cross-sectional view illustrating still another example of the combination structure of each roller of an air cleaner according to an embodiment of the present disclosure.
Figure 20:
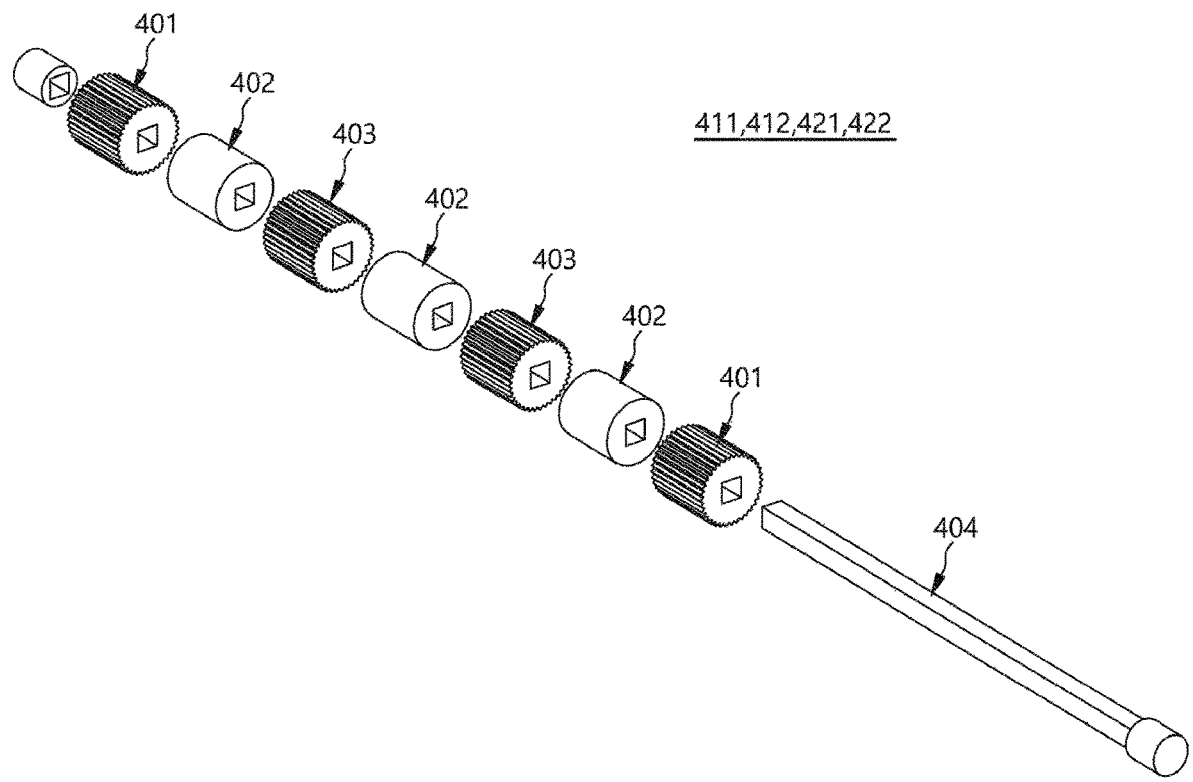
FIG. 20 is a cross-sectional view illustrating still another example of the combination structure of each roller of an air cleaner according to an embodiment of the present disclosure.

The first roller portion 401 and the second roller portion 402, as shown in FIGS. 19 and 20, may be formed as like-pipe bodies each having a through-hole in a center in the axis direction, and may be alternately arranged around an external circumferential surface of a rotation shaft 404 for installation.

The supply rollers 411 and 412 each may include a third roller portion 403. The third roller portion 403 may be provided so as to maintain firm contact with a center portion of the filter sheet 310. The third roller portion 403 may have a greater diameter than the second roller portion 402.

The concave-convex portion 405 may formed on an external circumferential surface of the third roller portion 403. Accordingly, a stable firm contact may be maintained with the center portion of the filter sheet 310.

In this example, the third roller portion 403 and the first roller portion 401 may be formed so as to have the same shape, and may be formed to have different concave-convex portions or different diameters.

According to an example embodiment, the third roller portion 403 and the first roller portion 401 may be formed to have the same shape. Further, a plurality of the third roller portions 403 are provided, and the second roller portion 402 is positioned between the first roller portion 401 and the third roller portion 403.

Regarding respective structures of the supply rollers 411 and 412, the concave-convex portion 405 may be provided on only the drive supply roller 411, only the driven supply roller 412, or both the drive supply roller 411 and the driven supply roller 412.

The formation of the concave-convex portion 405 on the drive supply roller 411 that is forcibly operated may be more advantageous in the forcible transportation of the filter sheet 310 than formation of the concave-convex portion 405 on only the driven supply roller 412. When considering this advantage, it may be more desirable that the concave-convex portion 405 is formed on at least the drive supply roller 411.

In an example where the concave-convex portion 405 is formed on both the drive supply roller 411 and the driven supply roller 412, it is desirable that the concave-convex portions 405 are formed at positions where the two supply rollers 411 and 412 face each other and are arranged to be engaged with each other.

At least one of the discharge rollers 421 and 422 may have the above-described concave-convex structure. That is, the concave-convex portion 405 having the same structure as in the supply rollers 411 and 412 may be formed on each of the discharge rollers 421 and 422, and thus the filter sheet 310 may be transported in a more stable manner.

In an example where the concave-convex portion 405 is formed on each of the discharge rollers 421 and 422, the filter sheet 310 may also be stably transported to discharge one cut-off section of the filter sheet 310.

Each of the discharge rollers 421 and 422 may also be formed to include a plurality of roller portions.

A cutting module 500 may now be described. The air cleaner according to an example embodiment may be configured to include the cutting module 500. The cutting module 500 is a module provided so as to cut the filter sheet 310.

Figure 21:
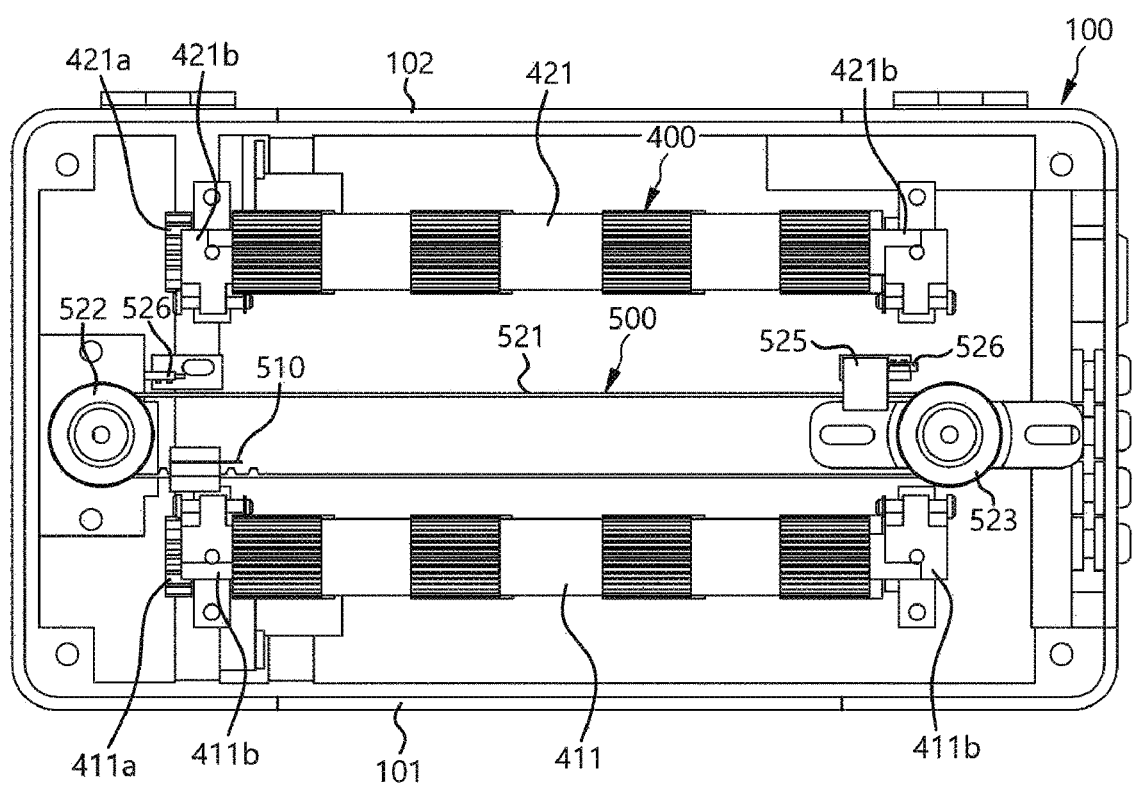
FIG. 21 is a plane view illustrating a state where a cutting module of an air cleaner according to an embodiment of the present disclosure is installed and a state where an upper covering portion and a lower guide plate are removed.
Figure 22:
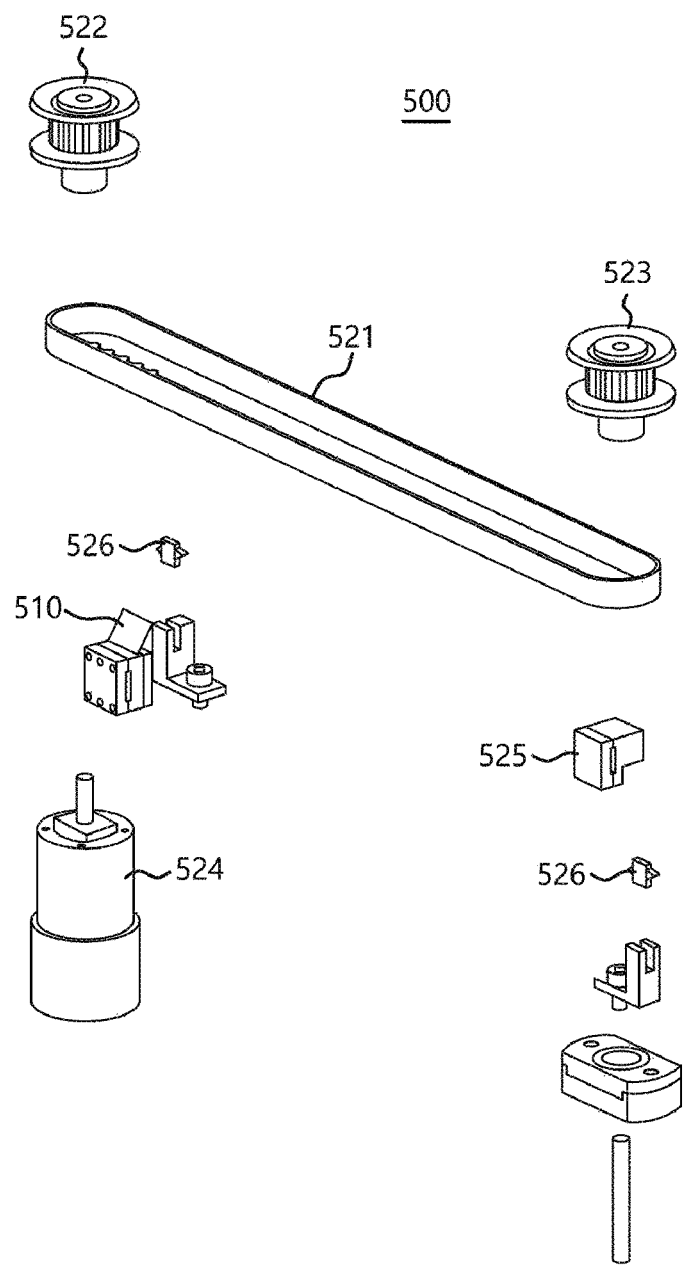
FIG. 22 is an exploded perspective view illustrating the cutting module of an air cleaner according to an embodiment of the present disclosure.
Figure 23:
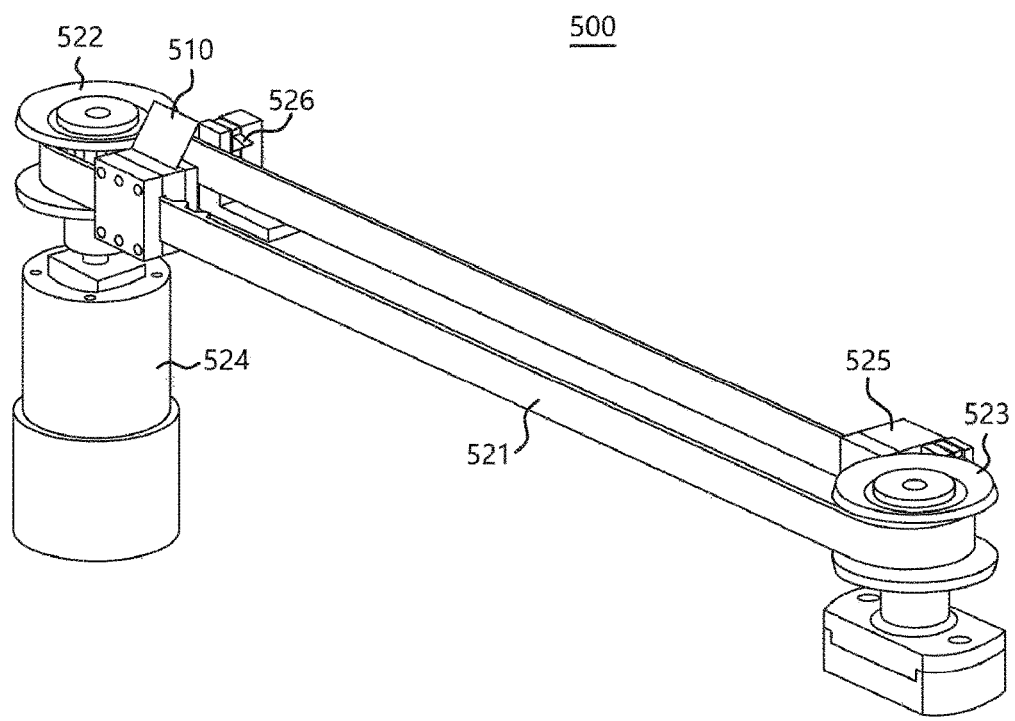
FIG. 23 is a perspective view illustrating the assembled cutting module of an air cleaner according to an embodiment of the present disclosure.
Figure 24:
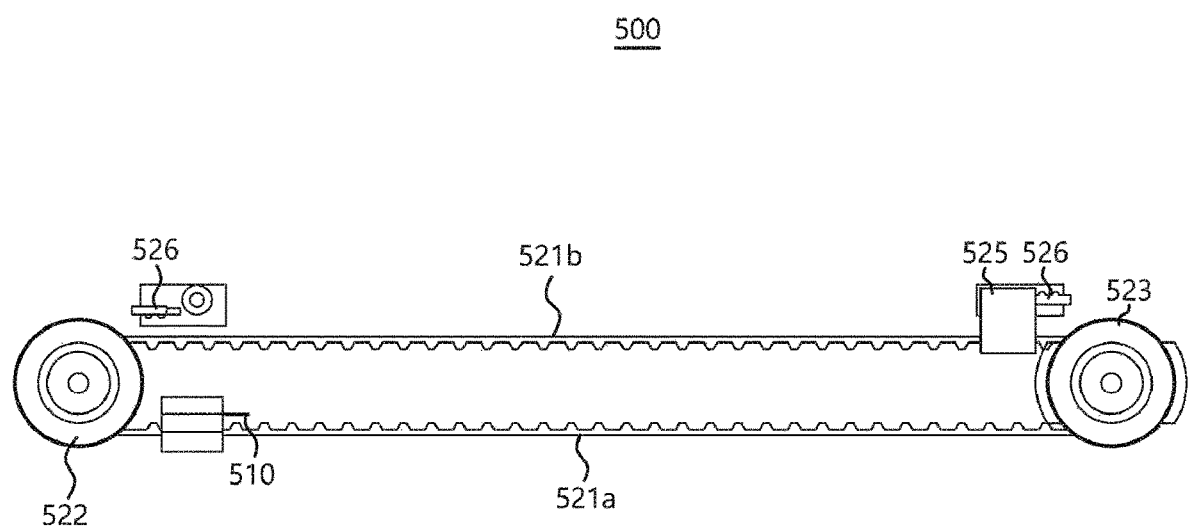
FIG. 24 is a plane view illustrating the cutting module of an air cleaner according to an embodiment of the present disclosure.
Figure 25:
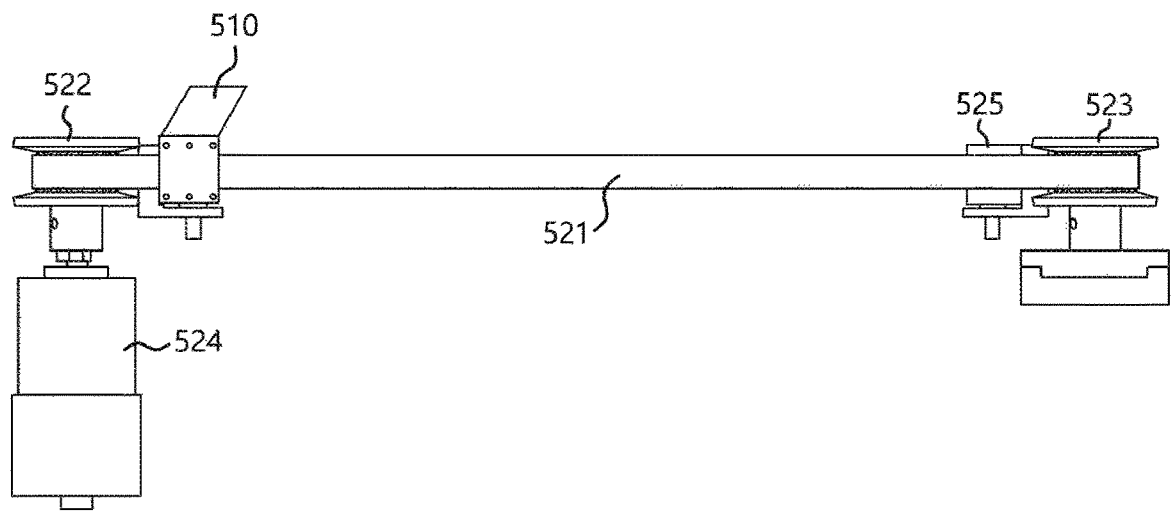
FIG. 25 is a front view illustrating the cutting module of an air cleaner according to an embodiment of the present disclosure.
Figure 26:
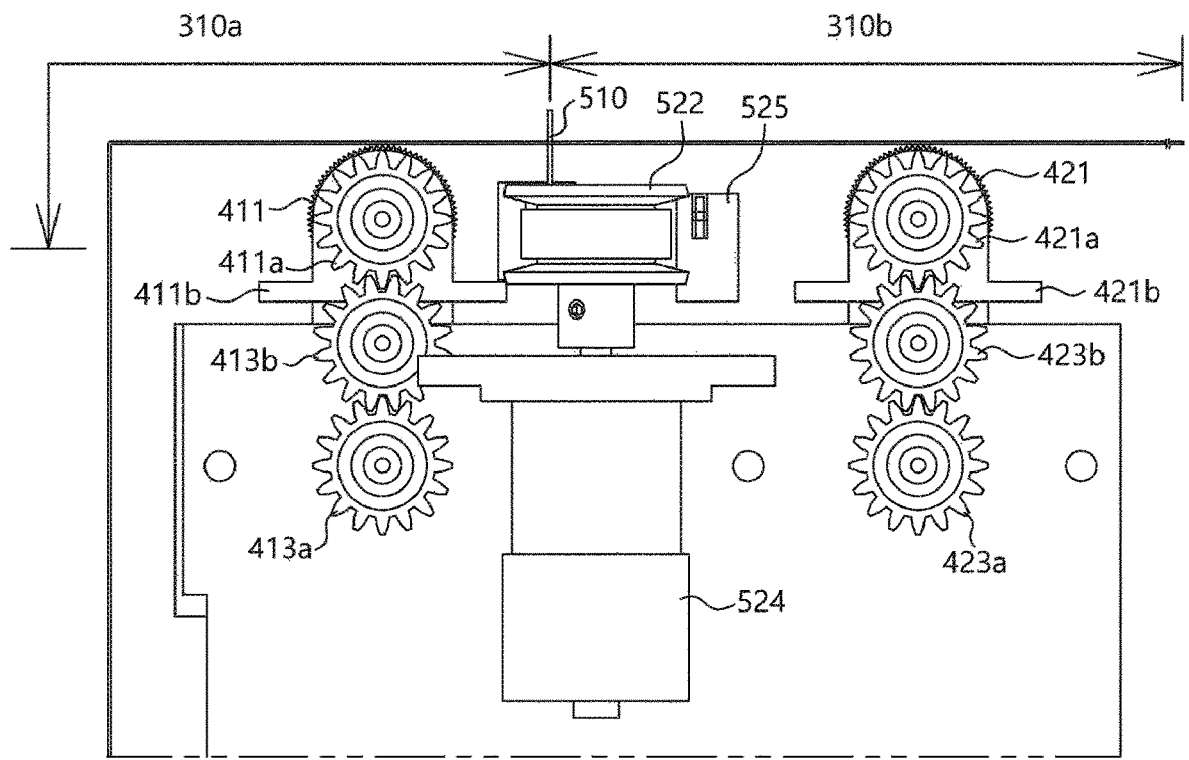
FIG. 26 is a cross-sectional view illustrating a portion that is unused and thrown away, of a filter sheet in an air cleaner according to an embodiment of the present disclosure and a portion that is used and discharged, of the filter sheet.
Figure 27:
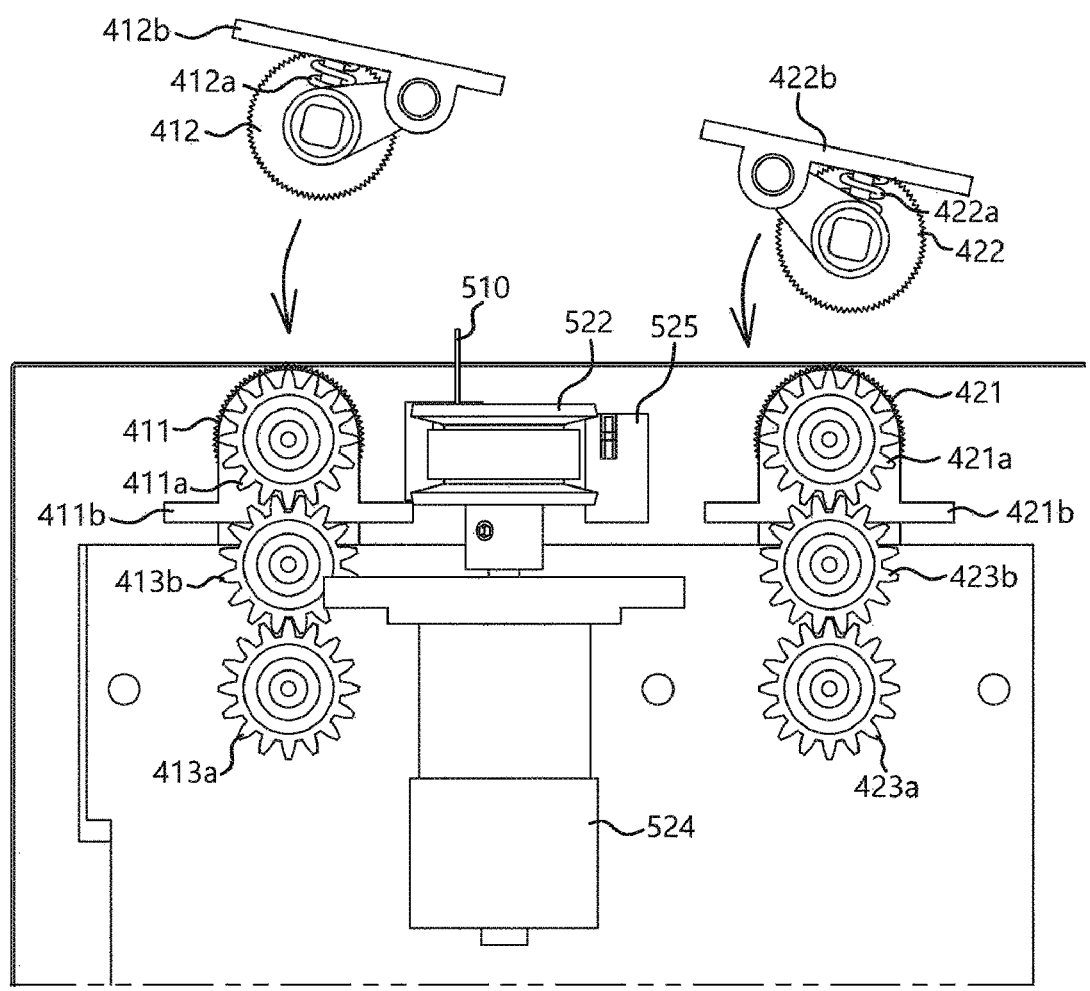
FIG. 27 is a cross-sectional view illustrating a process in which each supply roller and each discharge roller operate to maintain firm contact with the filter sheet in an air cleaner according to an embodiment of the present disclosure.
Figure 28:
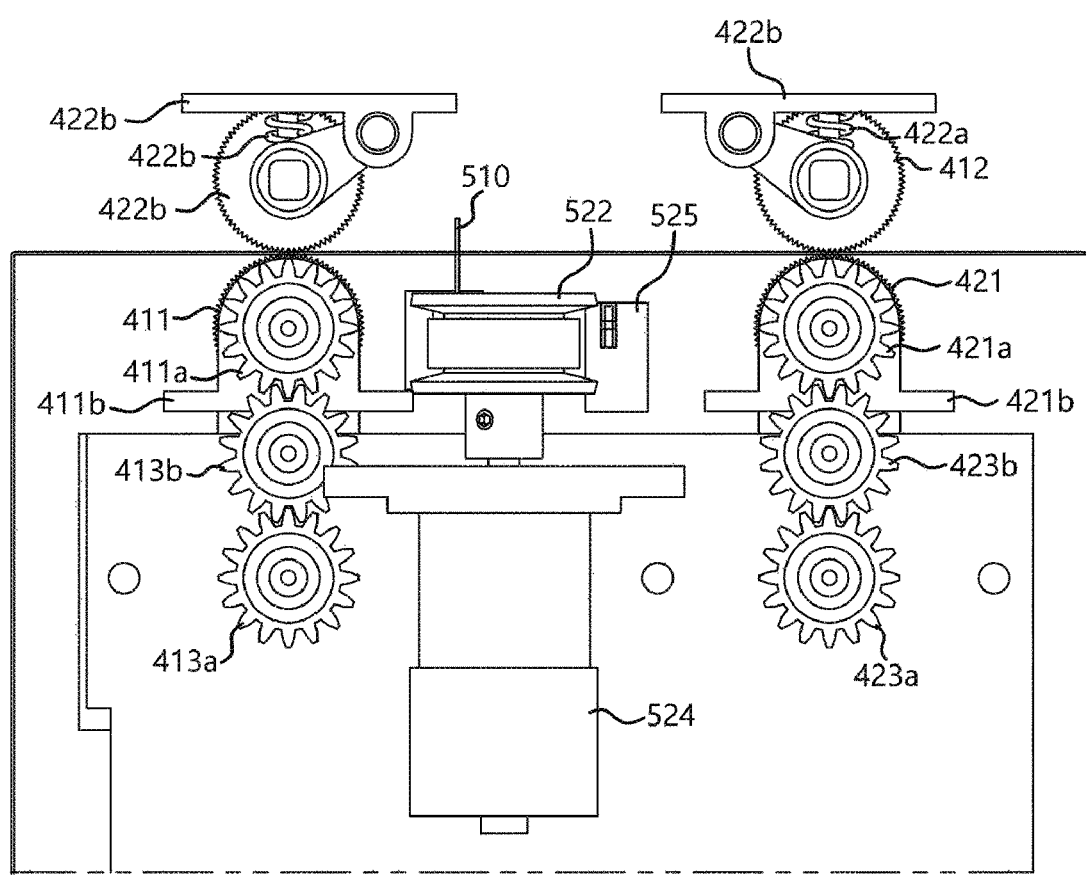
FIG. 28 is a cross-sectional view illustrating a state where each supply roller and each discharge roller maintain firm contact with the filter sheet in an air cleaner according to an embodiment of the present disclosure.
Figure 29:
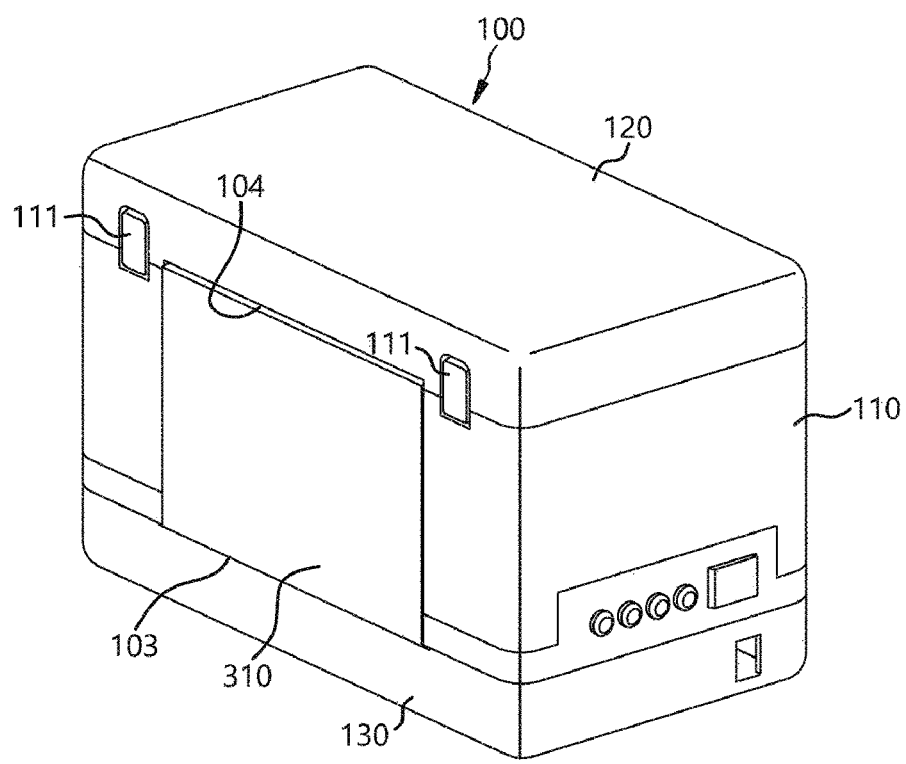
FIG. 29 is a perspective view illustrating a state where the filter sheet is installed in an air cleaner according to an embodiment of the present disclosure.

FIG. 21 is a plane view illustrating a state where the cutting module 500 is installed. FIG. 22 is an exploded perspective view illustrating the cutting module 500. FIG. 23 is a perspective view illustrating the assembled cutting module 500. FIG. 24 is a plane view illustrating the cutting module 500. FIG. 25 is a front view illustrating the cutting module 500.

As shown in FIGS. 21 to 25, the two discharge rollers 421 and 422 (forming part of the filter transportation module 400) may be configured to be arranged a distance away from the two supply rollers 411 and 412, and the cutting module 500 may be configured to be positioned between with the two discharge rollers 421 and 422 and the two supply rollers 411 and 412.

That is, in an example where a pliable material (such as paper or fabric that is easily bendable) is cut, a cutting portion of the pliable material may need to be kept flat by maintaining firm contact with both end portions thereof for stable cutting. When considering this need, one corresponding section of the filter sheet 310 is made to cut off between a portion with which the two discharge rollers 421 and 422 maintain firm contact, of the filter sheet 310 and a portion with which the two supply rollers 411 and 412 maintain firm contact, of the filter sheet 310.

As shown in FIGS. 4 and 21, the cutting module 500 may be positioned more adjacent to the two supply rollers 411 and 412 than to the two discharge rollers 421 and 422.

A portion of the filter sheet 310 that extends over a distance from the air inlet 101 to a cutting position is a portion 310*a* (refer to FIG. 26) that is actually unused and thrown away. For this reason, the cutting position is positioned maximally adjacent to the two supply rollers 411 and 412. Thus, the number of sections of the filter sheet 310 that are not actually used and thrown away can be minimized.

The cutting module 500 may be configured to include a cutter 510 for cutting the filter sheet 310 and a cutter moving unit for moving the cutter 510.

The cutter 510 may have a normal blade. The cutter moving unit is configured such that the cutter 510 is moved from one lateral end of one section of the filter sheet 310 up to another lateral end thereof. For example, the cutter moving unit is configured to include a belt 521, belt pulleys 522 and 523, and a cutter drive motor 524.

The two belt pulleys 522 and 523 are arranged so as to be positioned outward from opposite ends, respectively, of the drive supply roller 411. The belt 521 is installed such that both end portions thereof pass around the two belt pulleys 522 and 523.

The belt 521 may include a front portion 521*a* and a rear portion 521*b*. When viewed from above, the front portion 521*a* is positioned forward from portions of the belt 521 in contact with the two belt pulleys 522 and 523, and the rear portion 521*b* is positioned backward from the portion of the belt 521 (refer to FIG. 24). The cutter 510 is installed on one end portion of the front portion 521*a* of the belt 521.

Movement of the belt 521 by rotation of the belt pulleys 522 and 523 may cause the cutter 510 to be moved from one end of the drive supply roller 411 to the other end thereof.

A detection block 525 may be provided on one end portion (i.e., a portion opposite in direction to a blade) of the rear portion 521*b* of the belt 521. The detection block 525 may be configured such that the detection block 525 operates two switches 527 positioned on both sides, respectively, while being moved in the leftward-rightward direction by rotation of the belt 521. Thus, the cutter 510 may be prevented from being excessively moved.

In addition to the above-described components (i.e., the detection block 526 and the switch 527), various components may be provided for measuring a distance that the cutter 510 is moved. For example, an encoder may be installed on the belt pulleys 522 and 523, and various sensors (such as an optical sensor) may be installed.

The cutter drive motor 524 is configured to be combined with one belt pulley 522 or 523 (of the two belt pulleys 522 and 523) in a manner that possibly transfers drive power. The cutter drive motor 524 may be configured as a motor capable of operating at a power rating.

A control unit may now be described. The air cleaner according to an example embodiment may be configured to include a controller. The controller is a device for controlling operation each of the filter moving module 400 and the cutting module 500. The controller may include hardware and/or other structural components. The controller may control operation of each of the first roller drive motor 413 and the second roller drive motor 423 that constitute the filter moving module 400, and may control operation of the cutter drive motor 524 constituting the cutting module 500.

The controller may be configured to control operation of the drive discharge roller 421 and the drive supply roller 411 at the same time and thus transport the filter sheet 310.

The controller may be configured to control operation of the drive supply roller 411 in a state where the drive discharge roller 421 is stopped and that spreads out the filter sheet 310 in a flat manner.

The controller may be configured to control operation of only the drive discharge roller 421 and discharges one cut-off section of the filter sheet 310.

A process of installing the filter sheet 310 in the air cleaner according to an example embodiment may now be described below in more detail. The filter sheet 310 may be installed to use the air cleaner. The filter sheet 310 may be provided in a state of being wound around the sheet-winding roller 320 constituting the filter supply module 300. The sheet-winding roller 320 is installed in a manner that is rotatable within the lower covering portion 130 in a state where the lower covering portion 130 constituting the body housing 100 is open.

The filter sheet 310 installed in this manner around the sheet-winding roller 320 may be unwound off from within the body housing 100 through the filter outlet 103 formed in the body housing 100, may block the air inlet 101, and may be inserted back into the body housing 100 through the filter inlet 104.

The filter sheet 310 inserted through the filter inlet 104 may be installed so as to pass the two supply rollers 411 and 412. The filter sheet 310 may be installed such that an end portion thereof passes the two discharge rollers 421 and 422, may be positioned between the two supply rollers 411 and 412 and the two discharge rollers 421 and 422, or may be discharged to the outside through the filter discharge outlet 105 disposed at the rear surface of the body housing 100.

For easy first-time installation, the filter sheet 310 may be installed in a state where the upper covering portion 120 (in which driven supply roller 412 and the driven discharge roller 422 are installed) may be separated from the body portion 110.

An air cleaning process that uses the air cleaner according to an example embodiment may be described in more detail. This operation for air cleaning may be performed depending on the situation under control of the controller. The operation may be performed according to a preset program.

In an example where electric power is supplied according to the user's operation, when a request for performing an air cleaning function occurs (for example, when an operation button is selected), the controller operates the fan module 200 and drives a current of air.

By operation of the fan module 200, indoor air is introduced into the body housing 100 through the air inlet 101 and then is discharged back into a room through the air outlet 102.

The indoor air passes through the filter sheet 310 blocking the air inlet 101 before passing through the air inlet 101. In this process, materials having various oil components and articles may be filtered out by the filter sheet 310.

Subsequently, while air passing through the filter sheet 310 passes through the filter unit 140 between the air inlet 101 and the fan module 200, foreign materials (such as an odor component and fine particles) are filtered out from the air. Thereafter, the air passes through the fan module 200 and is then discharged into the room through the air outlet 102. This process is repeatedly performed, and thus the indoor air is gradually cleaned.

In an example where the user's request for stopping operation of the air cleaner occurs, where a preset time elapses, or where the degree of cleanness of the indoor air exceeds a preset degree of cleanness, operation of the air cleaner may be stopped.

Figure 30:
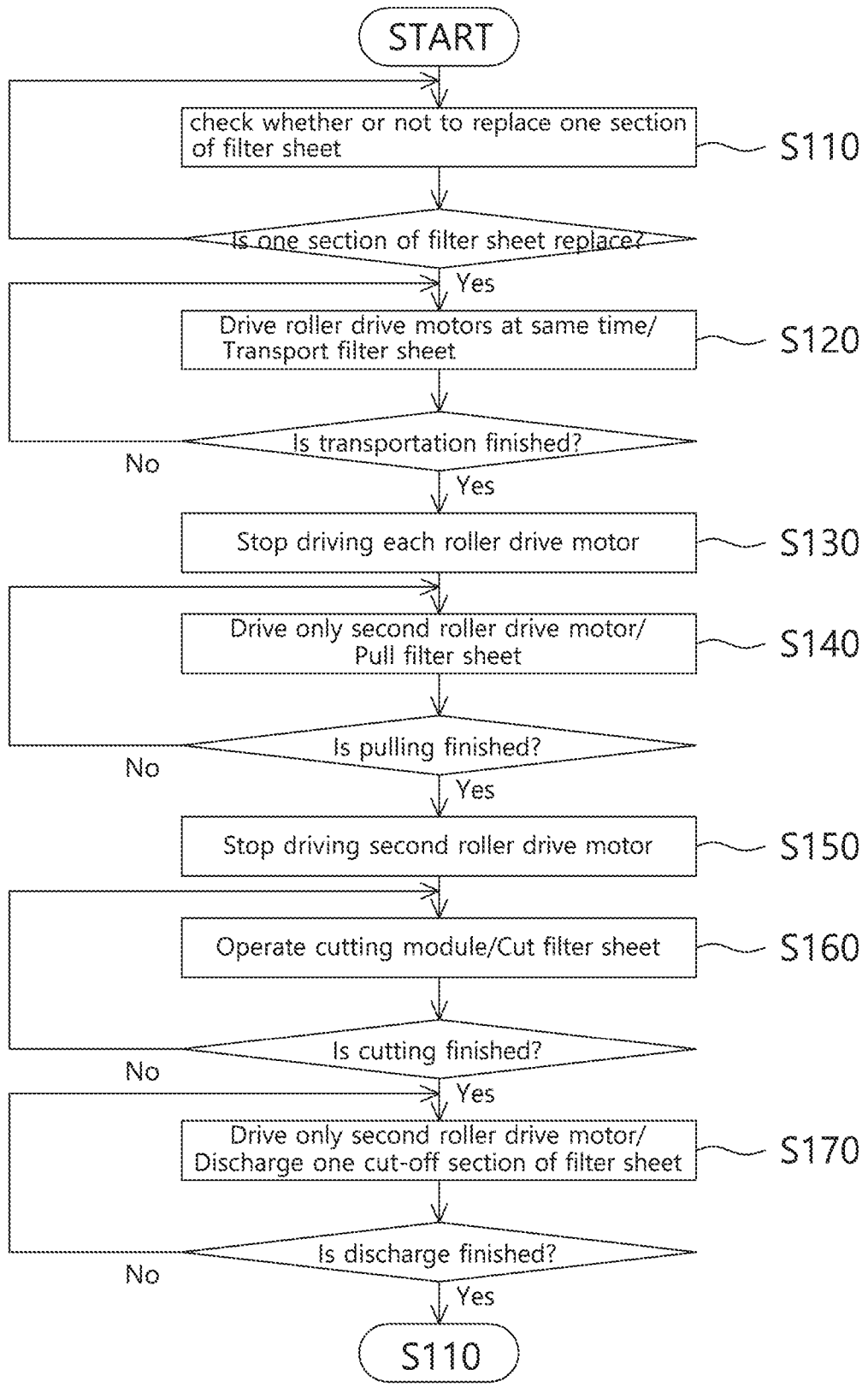
FIG. 30 is a flowchart for a process of automatically cutting the filter sheet and discharging one cut-off section of the filter sheet in an air cleaner according to an embodiment of the present disclosure.

A process of cutting off and discharging one used-up section of the filter sheet 310 in the air cleaner may be described in more detail with reference to a flow chart in FIG. 30 and operational views in FIGS. 31 to 35.

First, it may be determined whether or not one section of the filter sheet 310 positioned in front of the air inlet 101 is replaced (S110), and as a result of this process, one section of the filter sheet 310 may be replaced.

In this example, whether or not to replace one corresponding section of the filter sheet 310 may be determined by checking a flowing load of air passing through the one corresponding section of the filter sheet 310, by sensing the degree of contamination of the corresponding section of the filter sheet 310, or by the user's arbitrary determination. Further, whether or not to replace one corresponding section of the filter sheet 310 may be determined when an accumulated operating time of the fan module 200 exceeds a preset time and so forth.

As a result of satisfying one of the above-described conditions or one other condition, when a period for the replacement of one corresponding section of the filter sheet 310 is reached or when the replacement of one corresponding section of the filter sheet 310 is requested, the controller may perform operation control for the replacement of the one corresponding section of the filter sheet 310.

Figure 31:
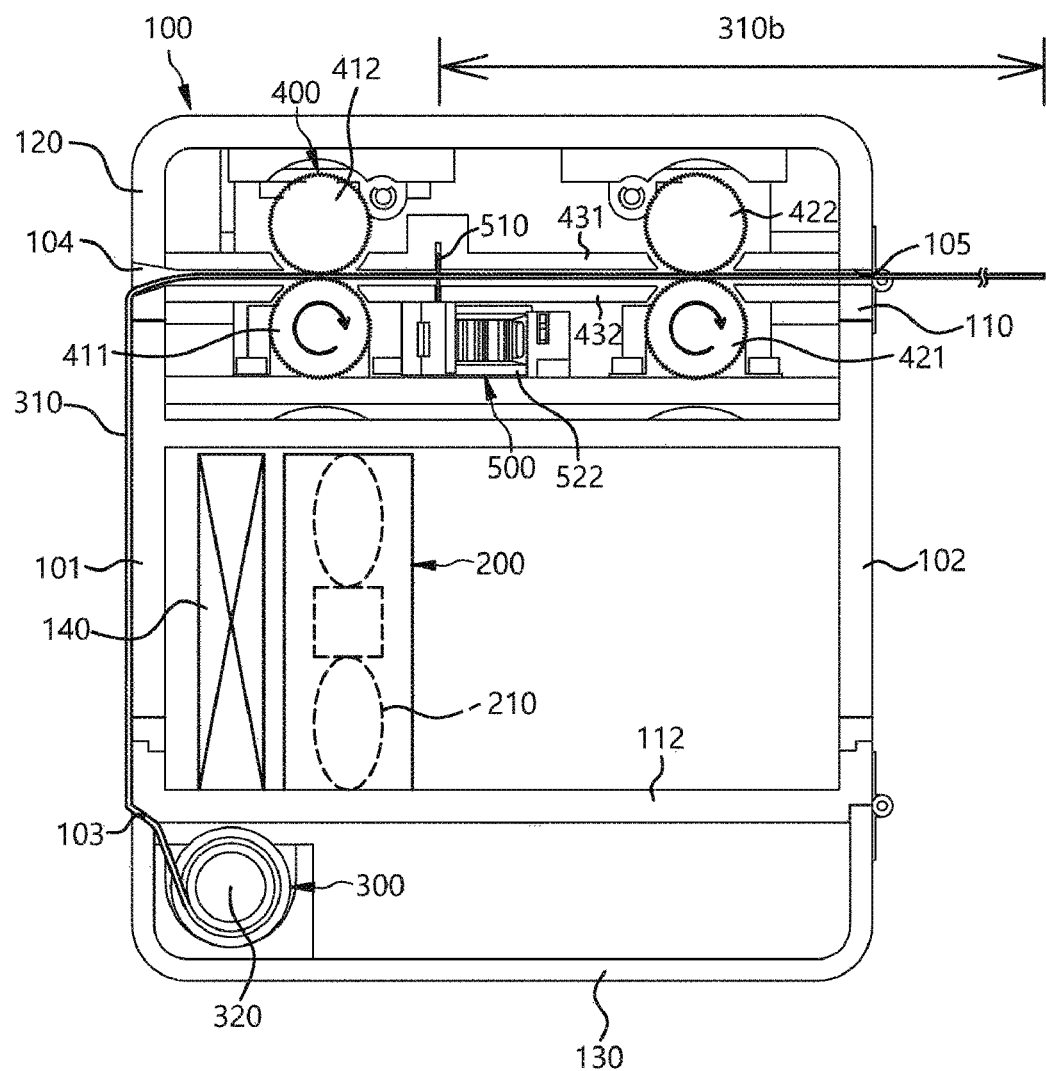
FIGS. 31 to 35 are cross-sectional views each illustrating an operational state where one used-up section of the filter sheet in an air cleaner according to an embodiment of the present disclosure is automatically cut off and is discharged.

That is, the controller may perform control such that the first roller drive motor 413 and the second roller drive motor 423 are driven at the same time (S120). Accordingly, as shown in FIG. 31, the drive supply roller 411 and the drive discharge roller 421 are rotated at the same time.

When the drive supply roller 411 and the driven supply roller 412 are rotated under control of the controller, the corresponding section of the filter sheet 310 interposed between the two supply rollers 411 and 412 is forcibly transported by a transportation force resulting from rotation of the two supply rollers 411 and 412.

Because at least one portion of the filter sheet 310 is interposed between portions on each of which the concave-convex portion 405 is formed, of the two supply rollers 411 and 412, one corresponding section of the filter sheet 310 is gradually transported, without sliding, from the two supply rollers 411 and 412 toward a portion on which the two discharge rollers 421 and 422 are positioned.

One corresponding section of the filter sheet 310 may be moved between the upper guide plate 431 and the lower guide plate 432 and thus may be smoothly transported to the portion on which the two discharge rollers 421 and 422 are positioned.

The separation distance h1 between the two guide plates 431 and 432 is set to be much greater than the gap distance h2 between each of the rollers 412 and 422 and the roller through-hole 431a in which each of the rollers 412 and 422 is positioned and between each of the rollers 411 and 421 and the roller through-hole 432a in which each of the rollers 411 and 421 is positioned. For this reason, an end portion of one corresponding section of the filter sheet 310 that is transported may pass through a gap between the roller through-hole 431a and each of the rollers 412 and 422, and a gap between the roller through-hole 432a and each of the rollers 411 and 421. Alternatively, the corresponding section of the filter sheet 310 can be prevented from being swung.

One corresponding section of the filter sheet 310, when positioned between the drive discharge roller 421 and the driven discharge roller 422 through the above-described process, additionally receives respective rotational forces of the two discharge rollers 421 and 422 and thus passes the two discharge rollers 421 and 422.

Subsequently, when an end portion of the one corresponding section of the filter sheet 310 passes the two discharge rollers 421 and 422 and then is further moved by a predetermined distance, driving by each of the first roller drive motor 413 and the second roller drive motor 423 is stopped under control of the controller (S130).

The predetermined distance may be approximately a distance by the portion 310b (i.e., the portion performing a filter function) (refer to FIGS. 26 and 31) blocking the air inlet 101, of the filter sheet 310 is moved to pass the cutting module 500.

When the one corresponding section of the filter sheet 310 is transported by the predetermined distance, another section of the filter sheet 310 that is wound, in a state of not being used, around the sheet-winding roller 320 (of the filter supply module 300) is placed at the position for blocking the air inlet 101 in the body housing 100.

While the one corresponding section of the filter sheet 310 is transported, a part thereof may be bent. The bent part may provide a load to the filter sheet 310. However, a portion to be in contact with the part to be bent is formed in an inclined or rounded shape such that the part to be bent is maximally gently bent. Thus, the filter sheet 310 may be prevented from being damaged due to the load provided by the bent part.

Subsequently, when a primary process of transporting the filter sheet 310 is completed, the controller may perform control such that only the second roller drive motor 423 is additionally driven (S140).

Figure 32:
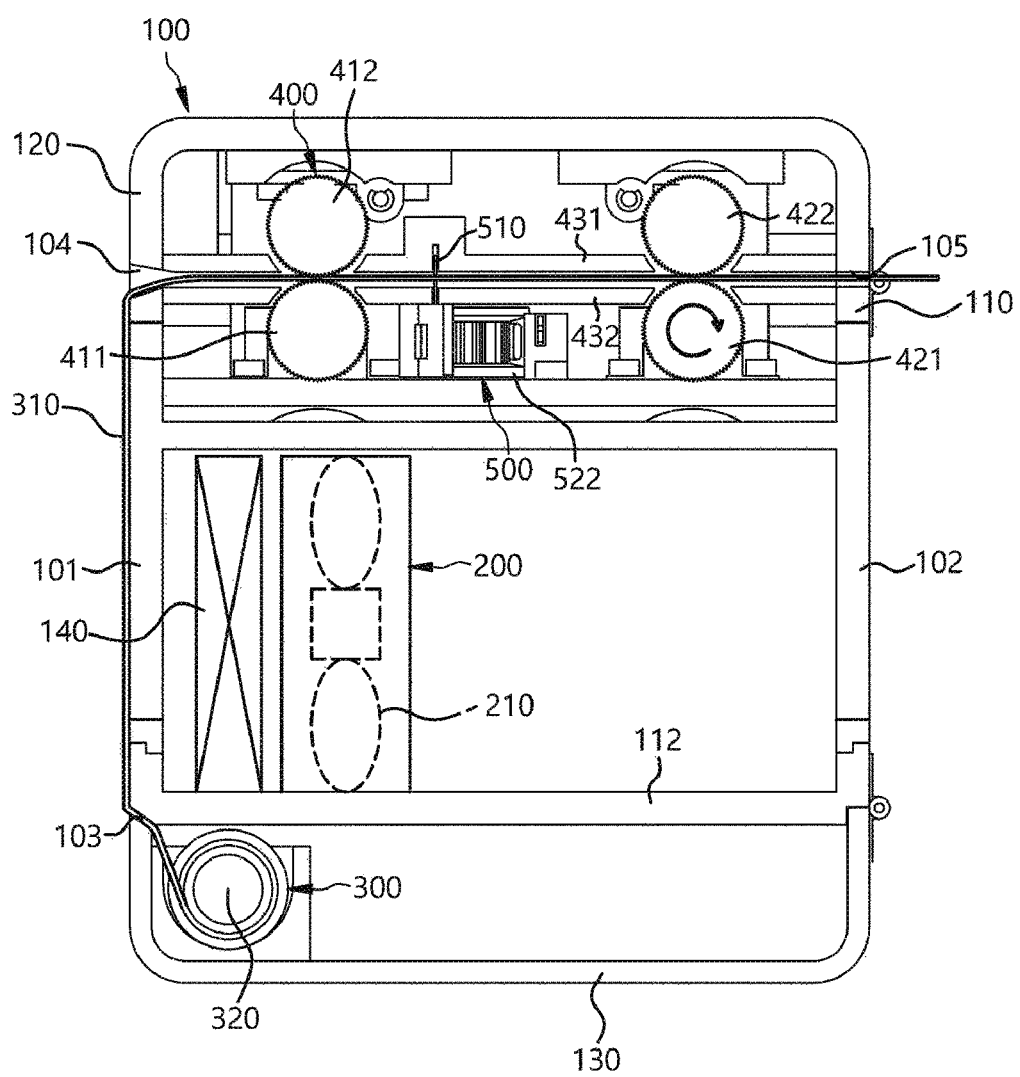
Figure 33:
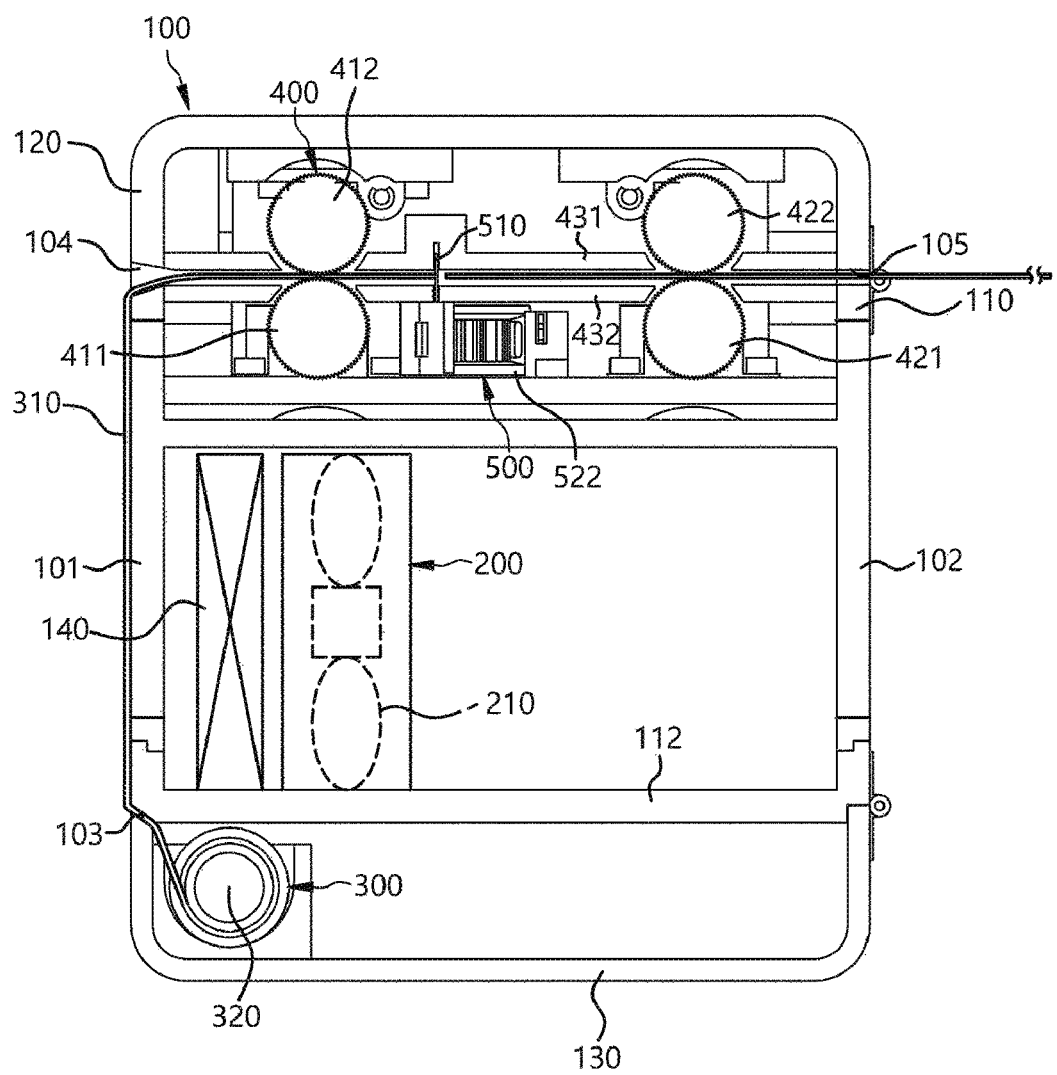

That is, control is performed such that, while a first side of the filter sheet 310 that is engaged with the two supply rollers 411 and 412 is kept fixed, a second side of the filter sheet 310 that is engaged with the two discharge rollers 421 and 422 is pulled. This operation is as shown in FIG. 32.

Accordingly, the filter sheet 310 may be kept flat.

Subsequently, in an example where the pulling is finished, the controller stops the driving by the second roller drive motor 423 (S150) and then controls the cutting module 500 such that the filter sheet 310 is cut (S160).

The controller operates the cutter drive motor 524 constituting the cutting module 500 and thus moves the belt 521. While being moved toward an operation direction of the belt 521, the cutter 510, fixed on one lateral end portion of the front portion 521a of the belt 521 by moving the belt 521, may cut off one section of the filter sheet 310 that is positioned between the drive discharge roller 421 and the driven discharge roller 422.

Figure 34:
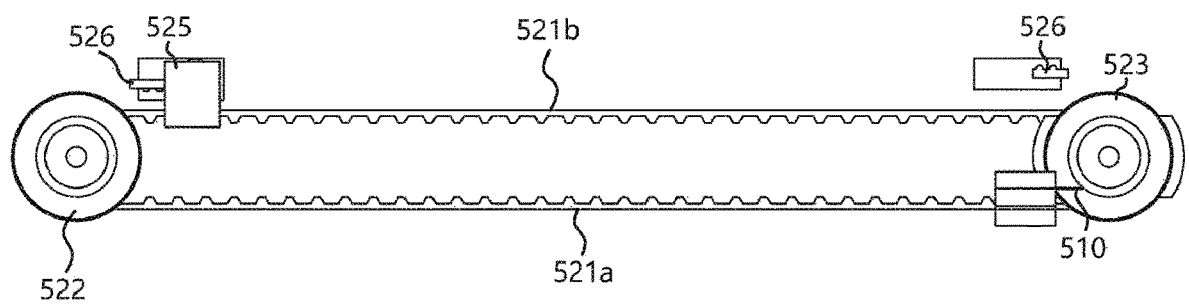

When the belt 521 is moved, the detection block 525 provided on one end portion (i.e., a portion opposite in direction to a blade) of the rear portion 521b of the belt 521 is moved in a direction opposite to the cutter 510. This operation is as shown in FIG. 34.

When the detection block 525 operates a switch 526 provided on an end portion in the moving direction of the detection block 525, of the rear portion 521b of the belt 521, the cutter drive motor 524 is stopped, and thus movement of the cutter 510 may be interrupted.

After the above-described process is completed, the cutter drive motor 524 may be controlled so as to be rotated in the opposite direction, and thus the cutter 510 may return to an original position thereof. After the above-described process is completed, the cutter 510 may also be controlled so as to be kept positioned at the corresponding position. Thereafter, the cutter 510 may be controlled such that when control that cuts the filter sheet 310 is performed, the cutter 510 cuts the filter sheet 310 while returning to the original position thereof.

Figure 35:
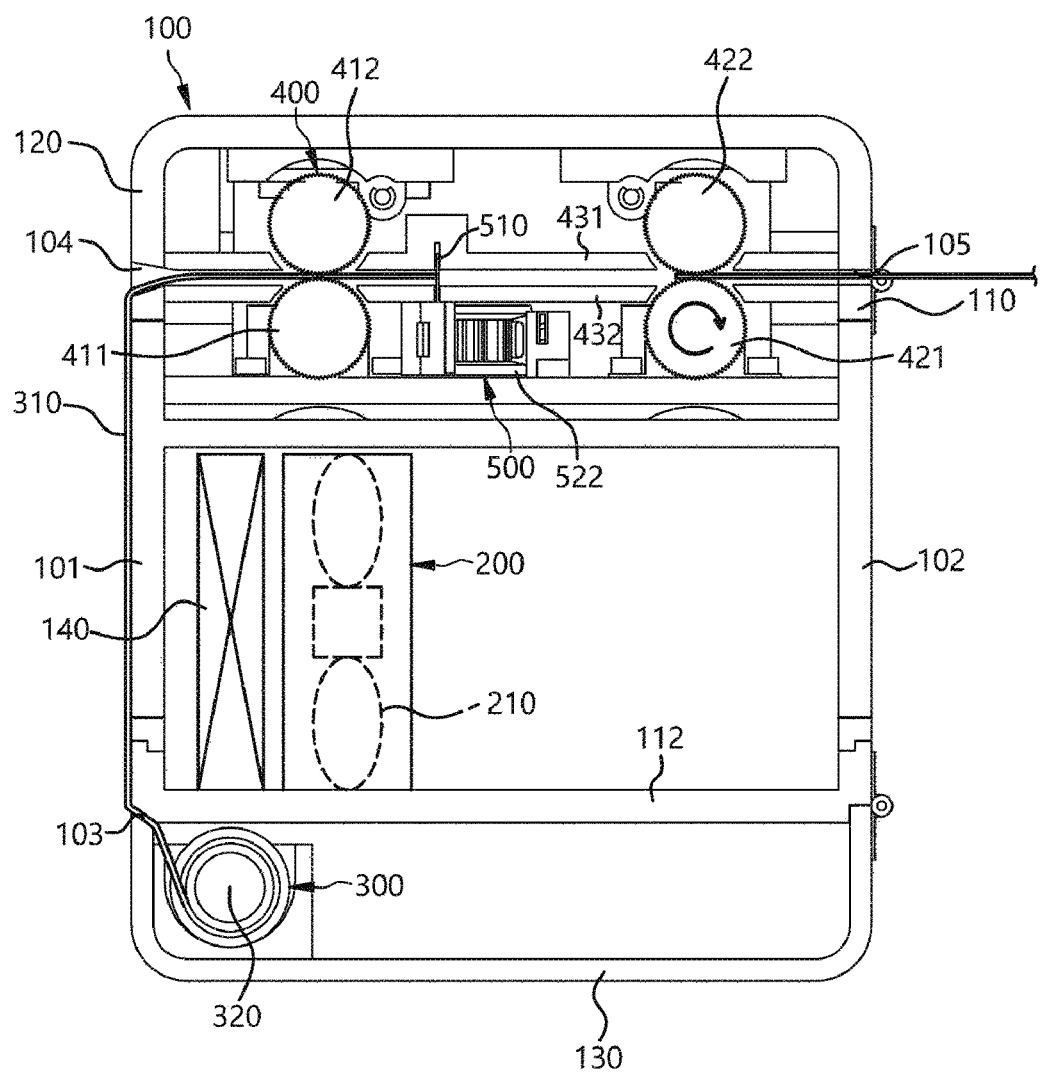

After the filter sheet 310 is cut by the cutter 510, the controller may control operation of the second roller drive motor 423 (S170), and thus the drive discharge roller 421 may be operated. One cut-off section of the filter sheet 310, interposed between the two discharge rollers 421 and 422, may be discharged to the outside through the filter discharge outlet 105 (in the body housing 100). This operation is as shown in FIG. 35.

Thereafter, the user may throw away the one section of the filter sheet 310 that is discharged through the filter discharge outlet 105, thereby completing the filter discharging.

The above-described operation for discharging one section of the filter sheet 310 may be performed by automatic control by the controller and may be performed by the user's manual control. For example, a separate operation button may be provided on the body housing 100, and a process of operating the first roller drive motor 413 and the second roller drive motor 423 at the same time may be performed for transportation of the filter sheet 310.

A process of operating only the second roller drive motor 423 and pulling the filter sheet 310 may be performed, a process of operating the cutting module 500 and cutting the filter sheet 310 may be performed, and/or a process of operating only the second roller drive motor 423 and discharging one cut-off section of the filter sheet 310 may be performed.

The air cleaner according to the present disclosure may be configured such that one used-up section of the filter sheet 310 may be discharged. Thus, the air cleaner may always be kept clean.

In the air cleaner, the cutting module 500 may be arranged maximally adjacent to the two supply rollers 411 and 412. Thus, discharge of the unused portion 310a of the filter sheet 310 may be minimized. Accordingly, although the filter sheet 310 with the same length is provided, a period for which the filter supply module 300 is used may be lengthened.

In the air cleaner, an operation of cutting off one used-up section of the filter sheet 310 is performed after both end portions of the one used-up section of the filter sheet 310 is flatly pulled in a state of being fixed. Thus, a cutting defect, which may occur when performing a cutting operation, can be prevented.

In the air cleaner, the filter sheet 310 that is separably dischargeable is configured to filter out an oil component and comparatively large-sized particles. Thus, a relatively high-priced filter that filters out an odor component or fine particles can be maximally protected.

In the air cleaner, one used-up section of the filter sheet 310 may be discharged by automatic control. Thus, operation of discharging the one used-up section of the filter sheet 310 can be performed easily and simply.

The air cleaner can be freely moved for use, and thus may be used in various applications (for example, used as a general-type air cleaner and a hood for removing an oil component occurring when cooking food) in various places.

In the air cleaner, the upper covering portion 120 (constituting the body housing 100) may be configured so as to be separable from the body portion 110. Thus, the filter transportation module 400 may be easy to maintain.

In the air cleaner, the lower covering portion 130 (constituting the body housing 100) may be configured so as to be separable from the body portion 110. Thus, the filter supply module 300 may be easy to replace.

The air cleaner according to the present disclosure is not limited to the structures thereof described above as implementation examples. That is, the air cleaner may be configured in such a manner that the structures thereof described as implementation examples are employed upside down.

For example, the filter transportation module 400 may be configured so as to be provided in a portion where the lower surface of the body portion 110 and the lower covering portion 130 face each other, and the filter supply module 300 may be configured so as to be provided within the upper covering portion 120.

The filter outlet 103 (to be disposed in the body housing 100) may be formed between the body portion 110 and the upper covering portion 120, and the filter inlet 104 may be disposed between the body portion 110 and the lower covering portion 130.

The filter sheet 310 may be configured so as to be moved within the body housing 100. A configuration may be provided in which the filter outlet 103 and the filter inlet 104 are not disposed in the body housing 100, and where the filter sheet 310 is transported along an internal surface of a front wall of the body housing 100.

The air cleaner may be transformed in various forms according to what the air cleaner is for or where to use the air cleaner.

The filter transportation module 400 may include a roller device that is different in form from the rollers described above. As an example, the roller device having a different form may be described in more detail. The filter transportation module 400 may include a roller housing 600 that presents an exterior appearance of the roller device. The roller housing 600 may be formed as at least one of the body portion 110 (constituting the body housing 100) and the upper covering portion 120. The roller housing 600 may be a portion that is integrally formed on at least one of the body portion 110 and the upper covering portion 120.

An accommodation space 602 may be formed within the roller housing 600. A roller 610 may be positioned in the accommodation space 602. The roller 610 may be the drive supply roller 411 and the driven supply roller 412, may be the drive discharge roller 421 and the driven discharge roller 422, or may be the drive supply roller 411 and the driven supply roller 412, and the drive discharge roller 421 and the driven discharge roller 422. The roller 610 may be a separate roller as compared to the above-described rollers 411, 412, 421, and 422.

At least one surface of the accommodation space 602 may be open. Only one portion of the one surface of the accommodation space 602 may be open.

As another example, the roller housing 600 may not necessarily need the accommodation space 602. A configuration in which both end portions of the roller 610 are supportable may be employed to substitute for the roller housing 600. For example, the configuration where only both end portions of the roller 610 are supportable may be employed without forming the accommodation space 602 in the body portion 110 and/or the upper covering portion 120.

Figure 36:
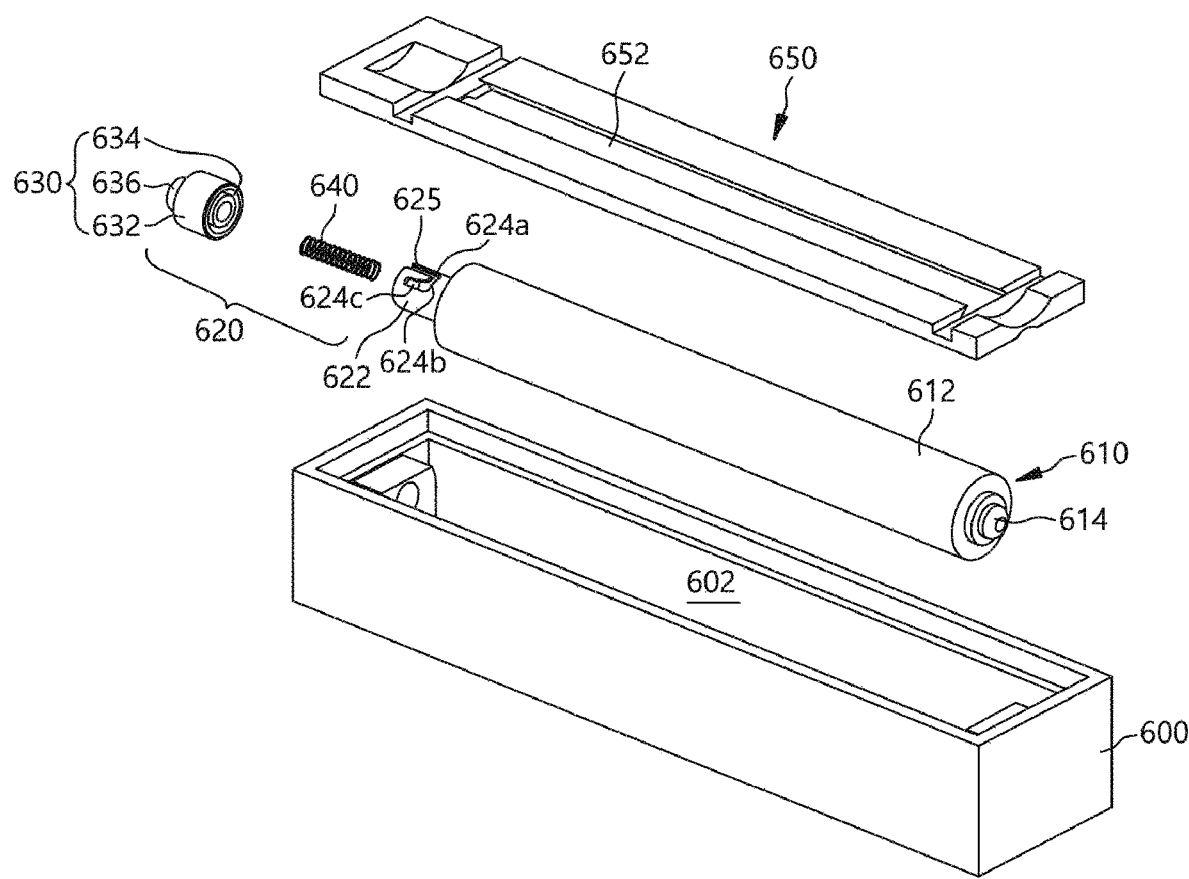
FIG. 36 is an exploded perspective view illustrating a desirable example of a roller device that is employable according to an embodiment of the present disclosure.

In an example, when the roller housing 600 has the accommodation space 602 in which one lateral surface is open, the roller 610 is seldom influenced by a surrounding environment where the roller device is installed. With reference to FIG. 36 (and subsequent drawing figures), the roller housing 600 is configured to accommodate only one roller 610. However, the rollers 411, 412, 421, and 422 may be accommodated at the same time in the body portion 110 and/or the upper covering portion 120 that serves as the roller housing 600. For reference, an example of accommodating the rollers 411, 412, 421, and 422 may be described as follows. The rollers 411 and 421 present in the body portion 110 may be covered by the lower guide plate 432 such that only respective portions thereof are exposed. The rollers 412 and 422 present in the upper covering portion 120 may be covered by the upper guide plate 431 such that respective portions thereof are exposed. The roller 610 installed in the roller housing 600 in the example shown in FIG. 36 may be covered by a transportation guide 650 as described below.

The roller housing 600 may have a first rotation center hole 604 at one end portion thereof. The first rotation center hole 604 may serve as the rotation center of the roller 610. The first rotation center hole 604 may be formed in one internal surface of the roller housing 604 in which the accommodation space 602 is formed. A second rotation center hole 606 may be formed, in a manner that faces the first rotation center hole 604, in an opposite internal surface of the roller housing 604 in which the accommodation space 602 is formed. The second rotation center hole 606 may serve as the rotation center of the roller 610. The first rotation center hole 604 may support a first end portion of the roller 610 in a rotatable manner, and the second rotation center hole 606 may support a second end portion of the roller 610 in a rotatable manner.

The roller 610 may serve to transport an object to be transported, such as a filter (for example, the filter sheet 310) made of paper or cloth. A pair of the rollers 610 is provided. The object to be transported may be transported between each of the pair of the rollers 610. In the air cleaner, the filter sheet 310 unwound from the filter in the form of a roll may be transported in such a manner as to pass between each of the pair of the rollers 610.

In the example shown in FIG. 36 (and subsequent drawing figures), one roller 610 is present for convenience. The roller 610 has a roller body 612 in the shape of a cylinder. The roller body 612 may have a sleek surface. However, protrusions in various forms may be formed on the surface of the roller body 612 according to properties of the object to be transported. The roller body 612 may be divided into a plurality of parts. The parts may be assembled into (or at) the roller body 612 having a predetermined length. The entire roller body 612 may be formed in one section.

A first rotation center shaft 614 may be provided on a first end portion of the roller body 612. The first rotation center shaft 614 may be integrally formed on the roller body 612. However, as another example, the first rotation center shaft 614 may be separately manufactured and may be combined with the roller body 612. The first rotation center shaft 614 may protrude over a predetermined distance from the first end portion of the roller body 612. The first rotation center shaft 614 is positioned within the first rotation center hole 604 in the roller housing 600. An external diameter of the first rotation center shaft 614 is equal to or somewhat smaller than an internal diameter of the first rotation center hole 604.

A predetermined section of the first rotation center shaft 614 extending from the roller body 612 may have a fixed diameter. The first rotation center shaft 614 may be configured in such a manner that the nearer a leading end of the first rotation center shaft 614 is, the smaller the external diameter of a free end portion. A section that has a predetermined external diameter as in FIG. 40 may be referred to as a rotation section 616. The rotation section 616 may come into contact with an internal surface of the first rotation center hole 604 and rotates relatively. A section which is connected seamlessly to the rotation section 616 may be referred to as a convergent section 618. The nearer the leading end of the rotation shaft, the smaller the external diameter of convergent section 618.

The rotation section 616 of the first rotation center shaft 614 may rotate relatively with respect to the first rotation center hole 604 when the roller 610 rotates. The rotation section 616 is rotatably supported in the first rotation center hole 604. The nearer the leading end of the first rotation center shaft 614 is, the smaller the external diameter of the convergent section 618 of the first rotation center shaft 614. The convergent section 618 may have a curved surface. In other words, the convergent section 618 has approximately the shape of a semi-sphere. The convergent section 618 may make the roller 610 easy to install and separate in and from the roller housing 600. For example, the convergent section 618 may make the roller 610 easy to remove from the roller housing 600, more specifically, the first rotation center shaft 614 easy to remove from the first rotation center hole 604. As another example, the convergent section 618 may have an inclined surface. For example, the first rotation center shaft 614 may have approximately the shape of a cone or the shape of a truncated cone. The convergent section 618 may have approximately the shape of a truncated triangle pyramid or the shape of a truncated quadrangular pyramid.

A contact end portion 619 may be provided between the roller body 612 and the first rotation center shaft 614. The contact end portion 619 is brought into contact with an entrance edge of the first rotation center hole 604. The contact end portion 619 may prevent the roller body 612 from being moved farther toward the first rotation center hole 604 and at the same time may minimize a contact area between the entrance edge of the first rotation center hole 604 and the roller body 612.

A shaft assembly 620 may be provided on the second end portion of the roller 610 (i.e., the end portion opposite in direction to the first rotation center shaft 614). The shaft assembly 620 may serve as the rotation center of the roller 610. Moreover, the shaft assembly 620 may serve to make an entire length of the roller 610 variable.

Because the shaft assembly 620 is provided, the length of the roller 610, more precisely, a position of the rotation center shaft present on the end portion of the roller 610 may be changed. Accordingly, the roller 610 may be easy to mount and separate on and from the roller housing 600. The roller 610 is not arbitrarily separated from the roller housing 600 in a state where the roller 610 is mounted on the roller housing 600.

The shaft assembly 620 may have a guidance body 622. The guidance body 622 may be provided on a second end portion of the roller body 612. The guidance body 622 may be separately manufactured and may be fixed on the roller body 612. Alternatively, the guidance body 622 and the roller body 612 may be manufactured into one section.

The guidance body 622, as shown in FIGS. 36 to 41, may be formed in the shape of a cylinder. The guidance body 622 may be formed in the shape of a polygonal cylinder.

A stable-nesting space 623 may be formed within the guidance body 622. One portion of the elastic member 640 described below may be positioned within the stable-nesting space 623.

At least one hanging channel 624 may be provided on the guidance body 622. The hanging channel 624 may serve to regulate a movement stroke of a movable body 630 described below. One end of the hanging channel 624 may serve as a leading end that is open, of the guidance body 622 and has the shape of the letter "J". Two hanging channels 624 are symmetrically formed on the guidance body 622. The hanging channel 624 is cut from an external surface of the guidance body 622 to an internal surface thereof. Alternatively, the hanging channel 624 may be formed as a groove in the shape of the letter "J". For example, the hanging channel 624 may be formed in an external surface of the guidance body 622. Alternatively, the hanging channel 624 may be formed on an internal surface of the guidance body 622.

Figure 41:
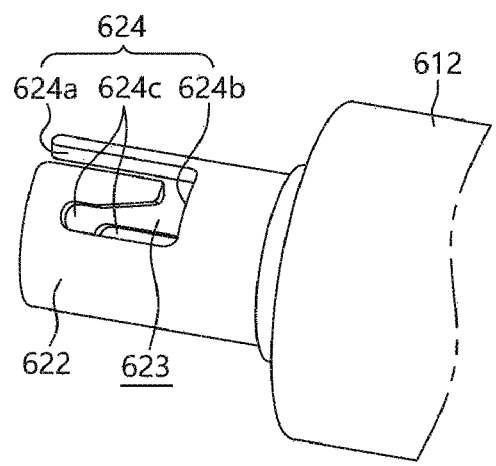
FIG. 41 is a perspective view illustrating a guidance body according to an embodiment of the present disclosure.

As shown in FIG. 41, the hanging channel 624 may be divided into at least three sections. For example, the hanging channel 624 may include an insertion portion 624a into which a hanging pin 638 is inserted. The hanging channel 624 may also include a connection portion 624b that is formed in a manner that is connected seamlessly to a first end of the insertion portion 624a at approximately a right angle. The hanging channel 624 may include a hanging portion 624c that is connected seamlessly to a second end of the connection portion 624b and extends substantially in parallel with the insertion portion 624a.

The hanging portion 624c may have a shorter distance than the insertion portion 624a and thus may extend up to a position close to the leading end of the guidance body 622. The hanging pin 638 may be positioned in the hanging portion 624c and may be firmly held on an end part of the hanging portion 624c.

The shaft assembly 620 may include the movable body 630 installed on the guidance body 622. The movable body 630 is moved along the guidance body 622, and thus a position of a leading end thereof is changed. Accordingly, the roller 610 may be kept mounted on the roller housing 600. Alternatively, the roller 610 may be separated from the roller housing 600.

An external cylinder 632 may form an exterior appearance of the movable body 630. According to the present embodiment, the external cylinder 632 has the shape of a cylinder. Alternatively, the external cylinder 632 may have the shape of a cylinder whose horizontal cross-section is polygonal. The external cylinder 632 may have the same shape of the horizontal cross-section as the guidance body 622.

Figure 42:
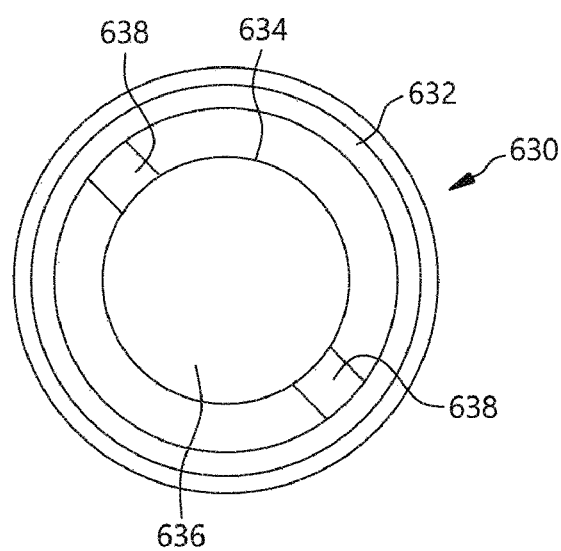
FIG. 42 is a perspective view illustrating a movable body according to an embodiment of the present disclosure.

With reference to FIG. 42, the external cylinder 632 may have an internal cylinder 634 inside. In one example, the internal cylinder 634 has the same shape as the external cylinder 632. In one example, the internal cylinder 634 has a smaller size than the external cylinder 632. The external cylinder 632 and the internal cylinder 634 are concentric with respect to each other. A second rotation center shaft 636 is provided on a leading end of the internal cylinder 634. Along with the first rotation center shaft 614, the second rotation center shaft 636 serves as the rotation center of the roller 610. The second rotation center shaft 636 is provided on the leading end of the internal cylinder 634. However, alternatively, the second rotation center shaft 636 may extend from a leading end of the external cylinder 632. In an example where the second rotation center shaft 636 is provided on the leading end of the external cylinder 632, the second rotation center shaft 636 may have a smaller external diameter than the external cylinder 632. The leading end of the internal cylinder 634 may be closed, and a rear end thereof may be open. Thus, one end portion of the elastic member 640 may be supported in the internal cylinder 634.

With reference to FIG. 42, the hanging pin 638 may be provided such that opposite ends thereof are connected to an external surface of the internal cylinder 634 and an internal surface of the external cylinder 632, respectively. The hanging pin 638 serves to connect the external cylinder 632 and the internal cylinder 634 to each other. The hanging pin 638 also serves to set a position where the movable body 630 is installed, on the guidance body 622. The hanging pin 638 is firmly held in the hanging portion 624c of the hanging channel 624, and may prevent the movable body 630 from being withdrawn from the guidance body 622.

The hanging pin 638 not only serves to connect the external cylinder 632 and the internal cylinder 634 to each other, but is the hanging pin 638 is also firmly held in the hanging channel 624. These two operations may be performed by separate components. For example, a hanging pin connecting the external cylinder 632 and the internal cylinder 634 and a hanging pin that is firmly held in the hanging channel 624 may be provided separately from each other. When the hanging channel 624 is formed in the shape of a groove in the external surface of the guidance body 622, the hanging pin 638 may be formed on the internal surface of the external cylinder 632. Further, when the hanging channel 624 is formed in the shape of a groove in the internal surface of the guidance body 622, the hanging pin 638 may be formed on the external surface of the internal cylinder 634.

The elastic member 640 may be installed such that both end portions thereof are supported in the stable nesting space 623 in the guidance body 622 and within the internal cylinder 634, respectively. The elastic member 640 may serve to support the movable body 630 with an elastic force such that the movable body 630 protrudes maximally outward from the guidance body 622. The elastic member 640 elastically pushes the movable body 630, and thus the hanging pin 638 is kept firmly held in the hanging portion 624c of the hanging channel 624.

As another example, a configuration may be employed where the movable body 630 is installed at a predetermined position on the guidance body 622 and where the guidance body 622 is movable toward the roller body 612 whenever necessary. In at least one example, the elastic member 640 may not be used. In this configuration, the hanging pin 638 may be pressed against the end of the hanging portion 624c of the hanging channel 624 and thus may be firmly held. Since the hanging pin 638 is pressed against the hanging portion 624c and thus is firmly held, the movable body 630 may be stationary with respect to the guidance body 622 without being arbitrarily moved. When it is necessary to move the movable body 630, an operator may press against the hanging pin 638. Thus, the hanging pin 638 may be withdrawn from the hanging portion 624c. Then, the hanging pin 638 may be positioned in the connection portion 624b, and thus the movable body 630 is relatively moved toward the roller body 612.

The first rotation center shaft 614 or the second rotation center shaft 636 may be connected to a drive source for the rotation of the roller 610. That is, a drive shaft or a gear that transfers drive power from the drive source may be combined with the first rotation center shaft 614 or the second rotation center shaft 636. Thus, the first rotation center shaft 614 or the second rotation center shaft 636 may receive the drive power.

Figure 43:
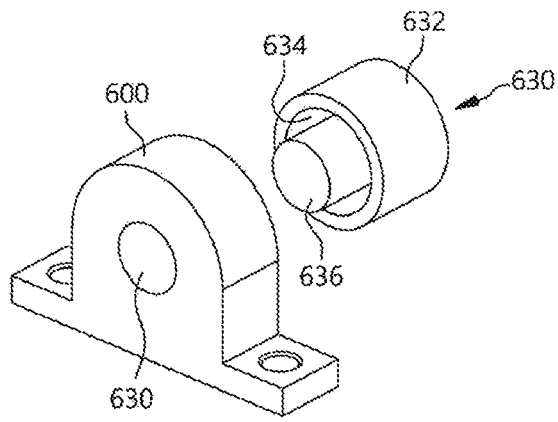
FIG. 43 is an exploded perspective view illustrating a roller that is a driven roller.

FIG. 43 illustrates a structure where the second rotation center shaft 636 of the movable body 630 is supported in the second rotation center hole 606 in an example where the roller 610 is a driven roller that is not rotated by the drive source. The driven roller may need to be freely rotated in such a manner as not to prevent movement of the object to be transported when the object to be transported is transported through the drive roller. In an example where the roller 610 is a driven roller, the first rotation center shaft 614 is rotatably positioned in the first rotation center hole 604 in the roller housing 600, and the second rotation center shaft 636 is rotatably positioned in the second rotation center hole 606 in the roller housing 600.

Figure 44:
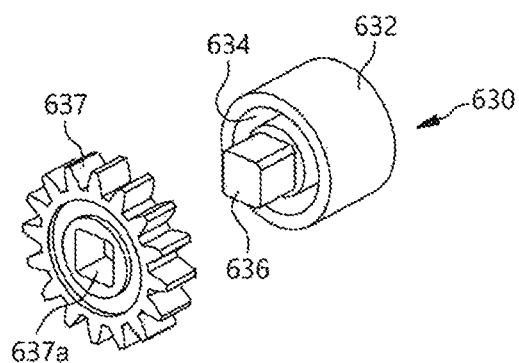
FIG. 44 is an exploded perspective view illustrating a roller that is a drive roller.

In an example where the roller 610 is a drive roller, in order to receive the drive power of the drive source, for example as shown in FIG. 44, the second rotation center shaft 636 may be combined with a drive gear 637 rotated by the drive source. The drive gear 637 is a final gear in a train of gears that transfers the drive power of the drive source, and a combination hole 637a is formed in the center thereof. The combination hole 637a has a horizontal cross-section in the shape of a quadrangle, and a second rotation center shaft 636a may have a horizontal cross-section in the shape of a rectangular bar. Alternatively, the second rotation center shaft 636a may have the same shape as the second rotation center shaft 636 of the driven gear. A key may be inserted into the combination hole 637a in the drive gear 637 and the second rotation center shaft 636 at the same time, and thus the drive power may be transferred.

Figure 37:
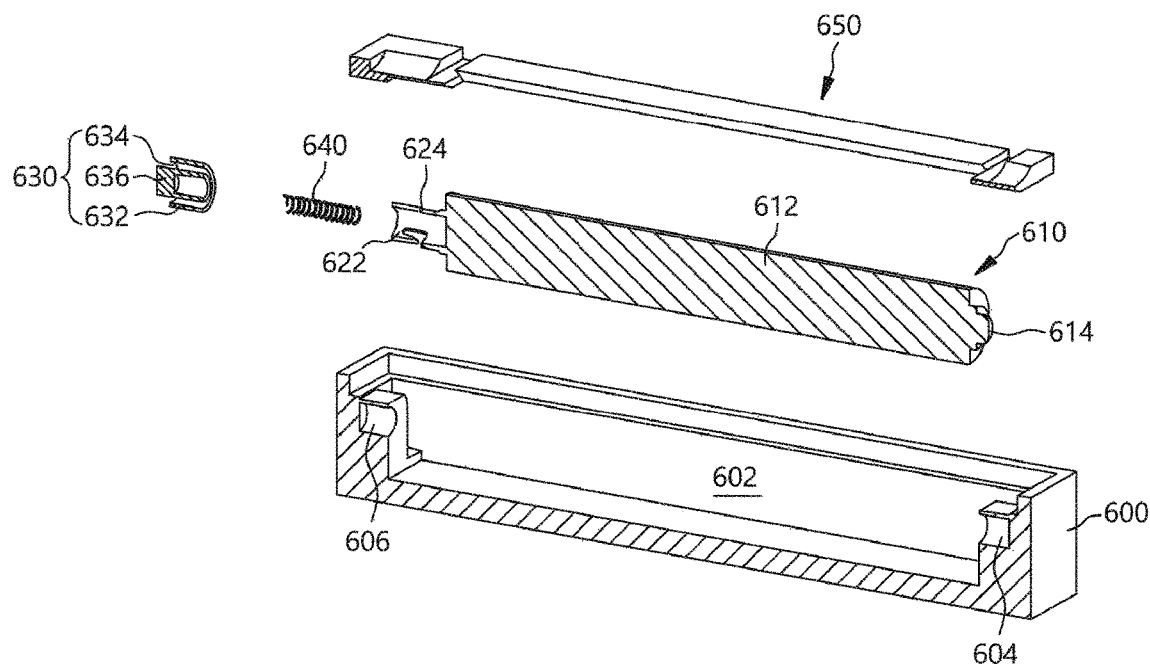
FIG. 37 is an exploded perspective view illustrating a configuration of the roller device according to an embodiment of the present disclosure.
Figure 38:
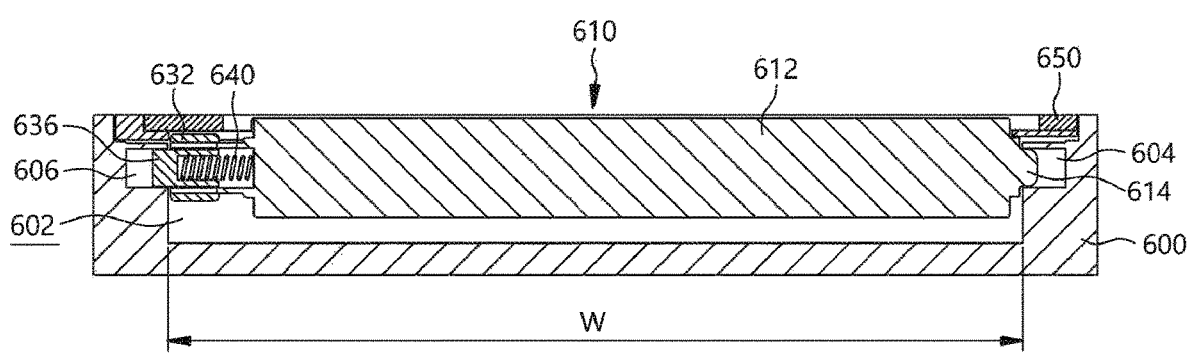
FIG. 38 is a cross-sectional view illustrating the configuration of the roller device according to an embodiment of the present disclosure.
Figure 39:
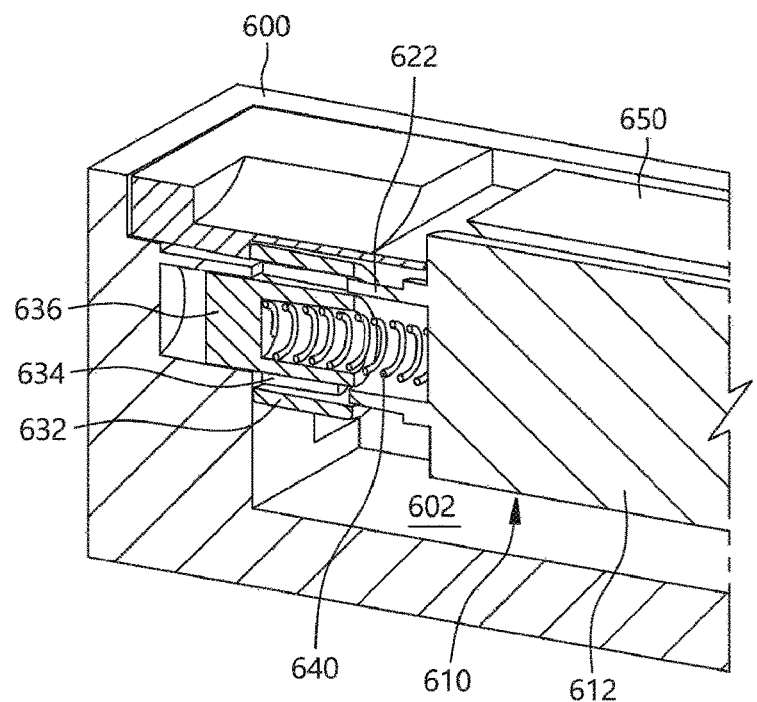
FIG. 39 is a cross-sectional view illustrating essential components of the roller device according to an embodiment of the present disclosure.
Figure 40:
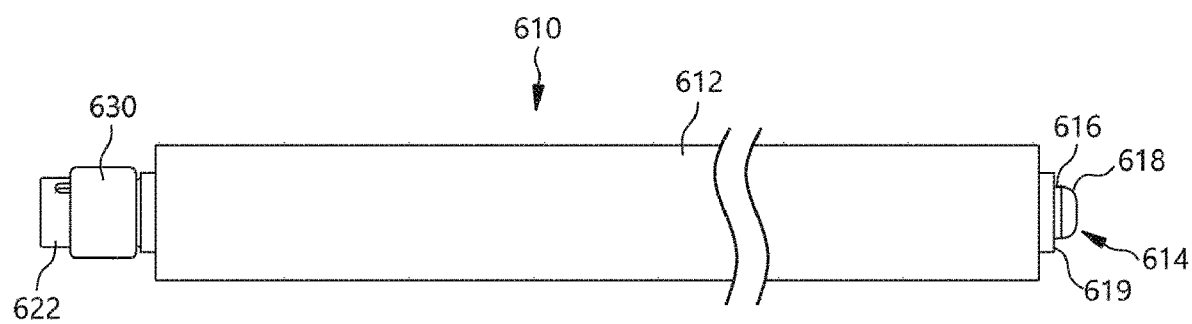
FIG. 40 is a front view illustrating a roller and a shaft assembly according to an embodiment of the present disclosure.

With reference to FIGS. 36 and 37, the transportation guide 650 may be installed on an open surface of the accommodation space 602 in the roller housing 600. The transportation guide 650 may serve to guide movement of the object to be transported when the object to be transported is moved through the roller 610. A transportation guide having a configuration similar to that of the transportation guide 650 may also be installed in the direction of a roller that is a counterpart of the roller 610. Therefore, a predetermined space may be formed between the transportation guides 650. While guided through this space, the object to be transported may be transported.

A roller opening 652 may be formed in the transportation guide 650 such that the object to be transported is brought into contact with the surface of the roller body 612. The roller opening 652 is formed so as to have the shape of a rectangle of which two sides are greatly lengthened compared with the other two sides, and one portion of the roller body 612 is made to protrude from the accommodation space 602 and thus to be exposed to the outside. One portion of the roller body 612 is positioned in the roller opening 652, and the surface of the roller body 612 is exposed to the outside through the roller opening 652. The surface of the roller body 612 may be positioned at the same position as a surface of the transportation guide 650 through the roller opening 652 or may somewhat protrude from the surface of the transportation guide 650 through the roller opening 652.

An example of a process in which the shaft assembly 620 is installed in the roller body 612 may be described.

A first end portion of the elastic member 640 may be stably nested in the stable nesting space 623 in the guidance body 622, and a second end portion of the elastic member 640 may be stably nested within the internal cylinder 634 of the movable body 630. The hanging pin 638 is inserted into the insertion portion 624a of the hanging channel 624. While the hanging pin 638 is inserted into the insertion portion 624a, the elastic member 640 is elastically transformed.

When the hanging pin 638 passes through the insertion portion 624a and reaches the connection portion 624b, the movable body 630 is rotated by a predetermined angle about the guidance body 622. By this operation, the hanging pin 638 is moved along the connection portion 624b. When the hanging pin 638 is moved from the connection portion 624b to an end portion thereof connected seamlessly to the hanging portion 624c, the hanging pin 638 may enter the hanging portion 624c by a restoring force of the elastic member 640. Because a portion connected seamlessly to the connection portion 624b of the hanging portion 624c has a relatively greater width, the hanging pin 638 may enter the hanging portion 624c in an easier manner.

When the hanging pin 638 is positioned on a leading end of the hanging portion 624c and is kept firmly held thereon, the movable body 630 may be kept firmly on the guidance body 622 and thus may be rotated together with the roller body 612. In an example where the hanging pin 638 is positioned on the hanging portion 624c, when the operator presses against the movable body 630, the movable body 630 may be moved along the guidance body 622. The movement of the movable body 630 moves the second rotation center shaft 636 present on a leading end of the movable body 630. The movement of the second rotation center shaft 636 makes the entire length of the roller 610 variable. When the entire length of the roller 610 is changed, in a state where a distance between the first rotation center hole 604 and the second rotation center hole 606 is maintained to a constant length, the roller 610 may easily mount on the roller housing 600.

Figure 45:
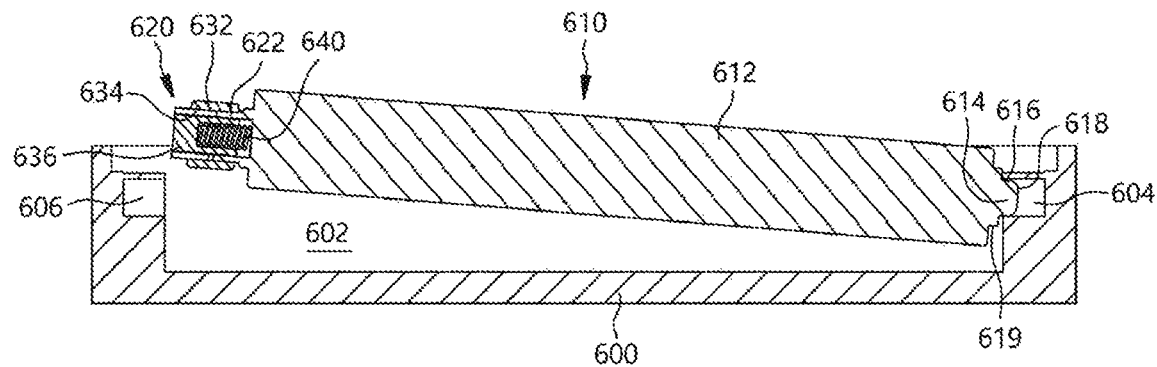
FIG. 45 is a cross-sectional view illustrating an operational state where the roller is mounted and separated on and from a roller housing according to an embodiment of the present disclosure.

A process of mounting and separating the roller 610 on and from the roller housing 600 may be described with reference to FIG. 45. The first rotation center shaft 614 is obliquely inserted into the first rotation center hole 604. The presence of the convergent section 618 on the first rotation center shaft 614 may make it possible to obliquely insert the first rotation center shaft 614 into the first rotation center hole 604. The convergent section 618 has a curved surface, an inclined surface, and/or the like, and thus the nearer a leading end of the first rotation center shaft 618 is, the smaller the diameter of the convergent section. Accordingly, the first rotation center shaft 614 may be obliquely inserted relatively deep into the first rotation center hole 604.

The movable body 630 is moved maximally closer to an end portion of the roller body 612. The roller body 612 is rotated about the first rotation center shaft 614 in the counterclockwise direction with respect to the drawing, and thus the second rotation center shaft 636 present on the movable body 630 is positioned at an entrance to the second rotation center hole 606 in the roller housing 600.

Figure 46:
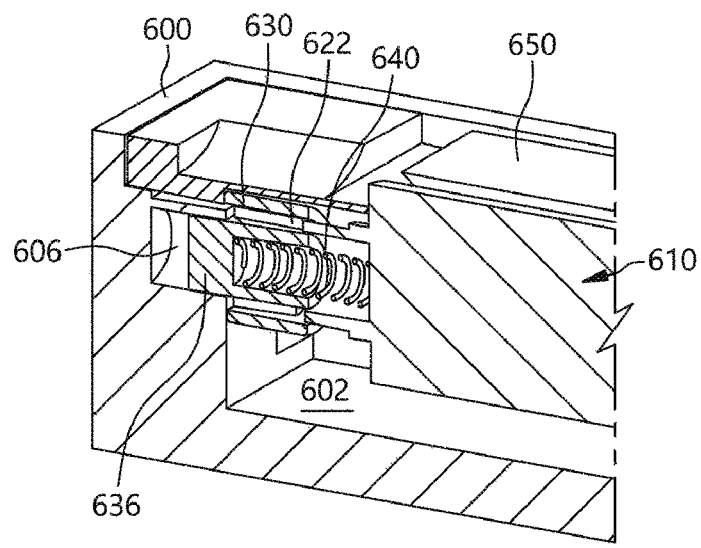
FIG. 46 is a perspective view illustrating an operational state where a second rotation center shaft of the roller is rotatably installed in a second rotation center hole.

In an example where the second rotation center shaft 636 is positioned at the entrance to the second rotation center hole 606, when the force that maintains the movable body 630 is released, the movable body 630 is moved along the guidance body 622 by the restoring force of the elastic member 640 and is inserted into the second rotation center hole 606. The first rotation center shaft 614 may be kept stably nested in the first rotation center hole 604, and the second rotation center shaft 636 is kept stably nested in the second rotation center hole 606. That is, the roller 610 is mounted on the roller housing 600 in a state of being rotatable. FIG. 46 illustrates that the second rotation center shaft 636 is inserted into the second rotation center hole 606 in the state of being rotatable.

Figure 47:
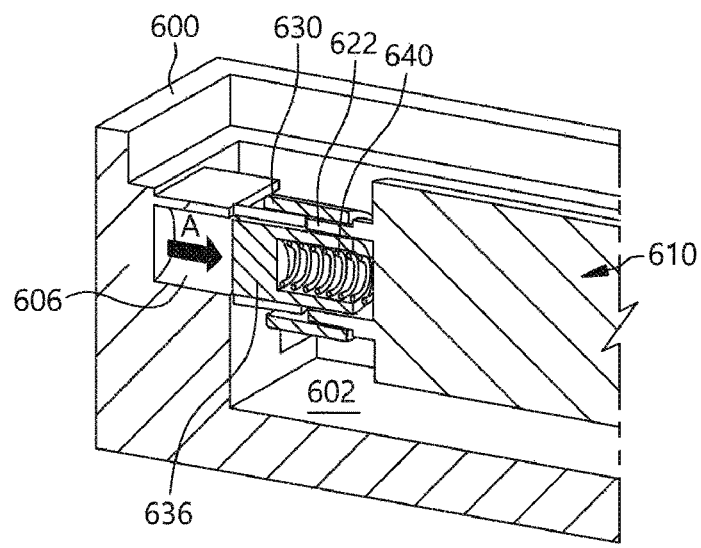
FIG. 47 is a perspective view illustrating an operational state where the second rotation center shaft of the roller is withdrawn from the second rotation center hole.

For cleaning and maintaining, the roller 610 is separated from the roller housing 600 in reverse order of the above-described steps used to mount the roller 610 thereon. That is, as shown in FIG. 47, the movable body 630 is moved along the guidance body 622 in order to compress the elastic member 640. The movement of the movable body 630 withdraws the second rotation center shaft 636 present on the movable body 630 from the second rotation center hole 606. The rotation of the roller body 612 about the first rotation center shaft 614 in the clockwise direction with respect to the drawing separates the roller body 612 from the accommodation space 602 in the roller housing 600.

In the illustrated implementation example, the first rotation center hole 604 and the second rotation center hole 606 are present in the roller housing 600, and the shaft assembly 620 having the second rotation center shaft 636 and the first rotation center shaft 614 are present in the roller 610. However, the rotation center holes 604 and 606 and the rotation center shafts 614 and 636 may be positioned in positions opposite to the current positions. The first rotation center shaft 614 and the shaft assembly 620 are present in the roller housing 600, and the first rotation center hole 604 and the second rotation center hole 606 are present in the roller 610.

An objective of the present disclosure is to remove various contaminants contained in air using a filter and to easily discharge one used-up section of a filter for always maintaining the filter in a clean state.

Another objective of the present disclosure is to precisely cut off one used-up section of a filter and thus prevent a cutting defect that occurs when cutting the one used-up section of the filter.

Still another objective of the present disclosure is to cut off one used-up section of a filter, to smoothly discharge the cut-off section of the filter, and to automatically transport a new section of the filter to a position for using the filter. Thus, a user's inconvenience can be minimized.

Still another objective of the present disclosure is to provide an air cleaner that is freely movable for use in various places.

Particularly, the air cleaner is used to remove contaminants containing an oil component occurring when cooking food.

Still another objective of the present disclosure is to provide an air cleaner having an internal structure that enables easy separation for easy maintenance.

Still another objective of the present disclosure is to suppress discharging of an unused portion of a filter.

Another objective of the present disclosure is to automatically remove a filter in a smooth manner.

Another objective of the present disclosure is to easily separate rollers. Accordingly, maintenance can be easily performed on the air cleaner, and a user can perform an operation of maintaining the air cleaner.

According to the present disclosure, there is provided a filter transportation module. The filter transportation module may include a drive supply roller and a driven supply roller that are arranged in such a manner as to face each other, and a drive discharge roller and a driven discharge roller that are arranged in such a manner as to face each other in the upward-downward direction. Accordingly, a filter sheet can be transported by rotation of the drive supply roller and the drive discharge roller, and one cut-off section of the filter sheet can be discharged by rotation of the drive discharge roller.

According to the present disclosure, the filter supply module may include one section of a filter sheet that is provided in such a manner as to block an air inlet in a body housing.

According to the present disclosure, a cutting module cutting the filter sheet may be provided within the body housing. Accordingly, one used-up section of the filter sheet can be automatically cut off.

According to the present disclosure, a body portion may be provided to the body housing, and the drive supply roller and the drive discharge roller may be positioned in the body portion.

According to the present disclosure, an upper covering portion in which a driven supply roller and a driven discharge roller are positioned may be included.

According to the present disclosure, the upper covering portion may be installed in a manner that is separable from the body portion. Accordingly, maintenance of constituent elements within the air cleaner can be easily performed.

According to the present disclosure, the air inlet may be formed in a front surface of the body housing, a filter outlet through which the filter sheet is exposed may be formed below the air inlet, and a filter inlet through which the filter sheet is inserted may be formed above the air inlet. Accordingly, the filter sheet can be installed in such a manner as to block the air inlet.

According to the present disclosure, the filter inlet may be formed in such a manner that the nearer an entrance to the filter inlet is, the more the filter inlet expands. Accordingly, the filter sheet can be easily inserted into the entrance to the filter inlet.

According to the present disclosure, the filter inlet may be formed in such a manner that a lower edge thereof is more inclined or rounded than an upper edge thereof. Accordingly, a load applied to one corresponding section of the filter sheet when transporting the filter sheet can be reduced.

According to the present disclosure, the filter outlet may be formed in a manner that is inclined upward or rounded. Accordingly, the filter outlet may be positioned maximally adjacent to the air inlet, and the filter supply module may be positioned below the air inlet.

According to the present disclosure, a sheet-winding roller of which both end portions are rotatably installed within the body housing may be included. Accordingly, the filter sheet that is wound around the sheet-winding roller can be provided.

According to the present disclosure, the filter supply module may be positioned below the air inlet. Accordingly, the filter sheet provided on the filter supply module can be prevented from being contaminated with air that is introduced after passing through the air inlet.

According to the present disclosure, the drive supply roller may receive drive power of a first roller drive motor and thus may be rotated.

According to the present disclosure, the driven supply roller may be configured in such a manner as to be engaged with the drive supply roller with the filter sheet in between and to be rotated by the drive supply roller. Accordingly, although drive power is not provided to the driven supply roller, the driven supply roller can forcibly transport the filter sheet along with the drive supply roller.

According to the present disclosure, the driven supply roller may be installed in a manner that is moved upward and downward by an elastic member. Accordingly, pressure for contact between the driven supply roller and the drive supply roller can be adjusted.

According to the present disclosure, the drive discharge roller may be configured in such a manner as to receive drive power of a second roller drive motor for rotation.

According to the present disclosure, the driven supply roller may be configured in such a manner as to be positioned in a manner that faces the drive discharge roller with the filter sheet in between and to be rotated together with the drive supply roller by the rotation thereof. Accordingly, although the driven discharge roller is not driven by a separate drive source, the driven supply roller can forcibly transport the filter sheet along with the drive supply roller.

According to the present disclosure, the driven discharge roller and the drive discharge roller may be configured in such a manner as to be brought into contact with each other. Accordingly, the filter sheet positioned between the driven discharge roller and the drive discharge roller can be forcibly transported.

According to the present disclosure, the driven discharge roller may be installed in a manner that is elastically moved upward and downward by the elastic member. Accordingly, the pressure for the contact between the driven discharge roller and the drive discharge roller can be adjusted.

According to the present disclosure, the filter transportation module may be positioned above the air inlet. Accordingly, the filter transportation module can be prevented from being contaminated with the air that is introduced after passing through the air inlet.

According to the present disclosure, the filter transportation module may include an upper guide plate and a lower guide plate. Accordingly, the filter sheet can smoothly pass between the upper guide plate and the lower guide plate without slackening or warping.

According to the present disclosure, the drive supply roller and the drive discharge roller may be positioned in such a manner that respective portions thereof pass through a roller through-hole in the lower guide plate and are exposed in the upward direction. Accordingly, the drive supply roller and the drive discharge roller can be brought into contact with the filter sheet transported along an upper surface of the lower guide plate, and thus the filter sheet can be forcibly transported.

According to the present disclosure, the driven supply roller and the driven discharge roller may be positioned in such a manner that respective portions thereof pass through a roller through-hole in the upper guide plate and are exposed in the downward direction. Accordingly, the driven supply roller and the driven discharge roller can be brought into contact with the filter sheet transported along a lower surface of the upper guide plate, and thus can assist in forcibly transporting the filter sheet.

According to the present disclosure, the upper guide plate and the lower guide plate may be formed in such a manner that a separation distance therebetween is greater than a gap distance between each roller through-hole and the roller. Accordingly, a phenomenon where the filter sheet passing through the two guide plates are discharged or stuck through the roller through-hole can be prevented.

According to the present disclosure, a concave-convex portion maintaining firm contact with the filter sheet may be formed on at least one portion of an external circumferential surface of the drive supply roller. Accordingly, the filter sheet can be forcibly transported by the drive supply roller.

According to the present disclosure, the concave-convex portion having a serrated structure may be formed on the drive supply roller.

According to the present disclosure, the concave-convex portion may be formed to have a cross-section with a sawtooth structure, a toothed gear structure, or one of various other polygonal structures.

According to the present disclosure, the drive supply roller may include a first roller portion on which the concave-convex portion is formed and a second roller portion on which the concave-convex portion is not formed. When the concave-convex portion is formed on the entire roller, warping deformation or defective shape-formation may occur. Furthermore, it is difficult to form the concave-convex portion on the entire roller by injection molding. According to the present disclosure, these problems do not occur.

According to the present disclosure, the first roller portion may be positioned on each of both end portions of the filter sheet. Accordingly, the filter sheet can be precisely transported in a fully spread-out state.

According to the present, the first roller portion and the second roller portion may be configured in such a manner as to be alternately arranged. Accordingly, the warping deformation can be prevented, and the injection molding can be easily performed.

According to the present disclosure, the first roller portion and the second roller portion may be configured in such a manner as to be separable from each other. Accordingly, the first roller portion and the second roller portion can be arranged according to a size of the filter sheet.

According to the present disclosure, a third roller portion may be included in the drive supply roller. Accordingly, stable firm contact with a center portion of the filter sheet is possible.

According to the present disclosure, a concave-convex portion may be formed on the third roller portion. Accordingly, the third roller portion can serve to forcibly transport the filter sheet.

According to the present disclosure, the cutting module may be positioned between the two discharge rollers and the two supply rollers. Accordingly, complete discharging of one used-up section of the filter sheet is possible.

According to the present disclosure, the cutting module may be positioned more adjacent to the two supply rollers than to the two discharge rollers. Accordingly, a usage of the filter sheet can be minimized.

According to the present disclosure, the cutting module may include a cutter cutting the filter sheet and a cutter moving unit moving the cutter.

According to the present disclosure, the cutter moving unit may be configured to include a belt on which the cutter is installed, a belt pulley to which one side of the belt is connected, and a cutter drive motor rotating the belt pulley clockwise and counterclockwise.

According to the present disclosure, operation of each of the filter transportation module and the cutting module may be controlled under the control of a controller.

According to the present disclosure, the drive discharge roller and the drive supply roller may be operated at the same time, and thus the filter sheet may be transported.

According to the present disclosure, when the filter sheet is transported, in a state where the drive supply roller is stopped, the drive discharge roller may be operated, and thus the filter sheet may be pulled.

According to the present disclosure, in a state where the filter sheet is pulled, the cutting module may be operated, and thus the filter sheet may be cut.

According to the present disclosure, the drive discharge roller may be controlled in such a manner that one cut-off section of the filter sheet is discharged.

According to the present disclosure, a configuration may be employed where rotation center shaft on at least a first side of the roller that serves as a rotation center of the roller is movable about the rotation center of the roller. Accordingly, an entire length of the roller can vary or a length of a structure for supporting the roller can vary simply. Thus, the roller can be easily mounted and separated.

According to the present disclosure, a shaft assembly having a rotation center shaft on the first side of the roller may be configured in such a manner as to be movable about the rotation center of the roller. Accordingly, the entire length of the roller can vary or the length of the structure for supporting the roller can vary. Thus, the roller can be easily mounted and separated.

According to the present disclosure, a convergent section may be formed on the rotation center shaft on a second side of the roller. The nearer a leading end of the rotation center shaft, the smaller a diameter of the convergent section is. Therefore, when the roller is mounted and separated, interference with a rotation center hole can be minimized, and thus the roller can be mounted and separated in a narrow space.

According to the present disclosure, an object to be transported and the roller may be brought into contact with each other through a roller opening in a transportation guide. Therefore, a contact area between the object to be transported and the roller can be minimized, and thus contamination of the roller by the object to be transported can be minimized.

According to the present disclosure, a first rotation center shaft and a first rotation center hole may be provided at a position where a first end portion of the roller and the roller housing correspond to each other. The first rotation center shaft and the first rotation center hole may serve as rotation centers of the roller.

According to the present disclosure, a second rotation center shaft and a second rotation center hole may be provided at a position where a second end portion of the roller and the roller housing correspond to each other. The second rotation center shaft and the second rotation center hole may be rotation centers of the roller.

According to the present disclosure, a shaft assembly including a movable body may be provided on the second end portion of the roller, with the second rotation center shaft being providing on a leading end of the movable body, and with a position of the movable body varying in such a manner that the second rotation center shaft is moved into and out of the second rotation center hole.

According to the present disclosure, the first rotation center shaft may include a rotation section brought into contact with an internal surface of the first rotation center hole and rotatably supported thereon, and the convergent section extending from the rotation section, wherein the nearer a leading end of the first rotation center shaft is, the smaller an external diameter of the convergent section is.

According to the present disclosure, the shaft assembly may include a guidance body in which a hanging channel is formed.

According to the present disclosure, the shaft assembly may include a movable body that is moved along the guidance body and in which the second rotation center shaft is formed.

According to the present disclosure, the shaft assembly may include a hanging pin that is positioned in the hanging channel and that regulates separation of the movable body from the guidance body.

According to the present disclosure, an elastic member may be provided between the guidance body and the movable body. Therefore, a state where the movable body protrudes from the guidance body can be elastically maintained.

According to the present disclosure, a hanging channel may include an insertion portion, a connection portion, and a hanging portion.

According to the present disclosure, one end of the insertion portion may serve as a leading end that is open, of the guidance body and may extend in a lengthwise direction of the roller.

According to the present disclosure, a first end of the connection portion may be connected to the insertion portion, and a second end thereof may be connected to the hanging portion.

According to the present disclosure, the handing portion may be formed in such a manner as to extend in parallel with the insertion portion.

According to the present disclosure, the movable body may include an external cylinder, an internal cylinder, and a hanging pin. The internal cylinder is concentric with the external cylinder, is positioned within the external cylinder, and includes the second rotation center shaft. The hanging pin is formed on an external surface of the external cylinder or an internal surface of the internal cylinder, is moved along the hanging channel, and is kept firmly held on the hanging portion.

According to the present disclosure, a first end of the hanging pin may be connected to an external surface of the internal cylinder, and a second end thereof may be connected to an internal surface of the external cylinder.

According to the present disclosure, the transportation guide in which the roller opening through which one portion of the roller is exposed is formed may be provided in the roller housing. Staining of the surface of the roller with contaminants contained in the object to be transported can be minimized.

According to the present disclosure, the roller may be positioned in an accommodation space formed within the roller housing and may be exposed to the outside through the roller opening in the transportation guide.

According to the present disclosure, the roller housing that has the first rotation center hole on a first side thereof and has the second rotation center on a second side may be included.

According to the present disclosure, the roller of which both end portions are rotatably supported in the first rotation center hole, and the second rotation center hole and of which a surface is brought into contact with the object to be transported may be included.

According to the present disclosure, the first rotation center shaft and the second rotation center shaft may be included. The first rotation center shaft protrudes from the first end portion of the roller, is positioned in the first rotation center hole, and is the rotation center of the roller. The second rotation center shaft that is positioned on the second end portion of the roller, is positioned in the second rotation center hole, and is the rotation center of the roller may be provided.

According to the present disclosure, the shaft assembly may be configured in such a manner that the second rotation center shaft is moved in the lengthwise direction of the roller.

The air cleaner according to the present disclosure can provide at least one of the following advantages.

According to the present disclosure, an operation of cutting off one used-up section of the filter sheet may be performed after both end portion of the one used-up section of the filter sheet are pulled in opposite directions in a state of being fixed. Thus, the cutting defect that may occur when performing a cutting operation can be prevented.

According to the present disclosure, the cutting module may be arranged more adjacent to the two supply rollers that to the two discharge rollers. Thus, discharging of an unused portion of the filter sheet can be minimized. Although the filter sheet 310 with the same length is provided, a period for which the filter supply module is used can be lengthened.

According to the present disclosure, one used-up section of the filter sheet may be discharged by automatic control. Thus, the filter sheet can be discharged easily and simply.

According to the present disclosure, the concave-convex portions may be formed on each of the external circumferential surfaces of the two supply rollers and each of the external circumferential surfaces of the two discharge rollers. Thus, the filter sheet can be transported smoothly without sliding.

When cutting the filter sheet, it is possible that both sides of a section of the filter sheet to be cut off are pulled in opposite directions. Thus, the cutting defect can be prevented.

The air cleaner according to the present disclosure may be freely moved for use. Thus, the air cleaner can be used in various applications (for example, used as a general-type air cleaner and a hood for removing oil components occurring when cooking food) in various places.

According to the present disclosure, the upper covering portion constituting the body housing may be separated from the body portion. Thus, the filter transportation module can be easily maintained.

According to the present disclosure, the lower covering portion constituting the body housing may be separated from the body portion. Thus, the filter supply module can be easily replaced.

According to the present disclosure, at least one of the first rotation center shaft and the second rotation center shaft that serve as the rotation centers of the roller is movable along the rotation center shaft of the roller. Accordingly, an operation of mounting and separating the roller on and from the roller housing can be simply performed.

According to the present disclosure, the movable body on which the rotation center shaft is provided can be moved according to an operator's operation without using any tool. That is, only with the operator's fingers, the movable body can be operated, and thus the rotation center shaft can be moved. Moreover, although a space in which the roller is installed is narrow, the operator can perform the operation of separating and/or mounting the roller. Miniaturization of a product, for example, an air cleaner, in which a roller device is used is possible.

According to the present disclosure, the convergent section is formed on the rotation center shaft other than the rotation center shaft that is moved. The nearer the leading end of the rotation center shaft, the smaller the diameter of the convergent section is. Accordingly, when the operation of mounting and separating on and from the roller housing is performed, due to the presence of the convergent section, the roller can be obliquely mounted on or separated from the roller housing. Moreover, the effect of miniaturizing the roller device through a simpler configuration can be achieved.

According to the present disclosure, the transportation guide guiding the object to be transported is provided. Through the transportation guide, only one portion of the roller is exposed toward a space into which the object to be transported is transported. Therefore, contaminants contained in the object to be transported can be suppressed from being dispersed to the roller, and thus the contaminants can be suppressed from remaining within the product in which the roller device is used.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air cleaner, comprising:
   a body housing having an air inlet and a filter discharge outlet;
   a fan module provided within the body housing and configured to be driven such that air is provided through the air inlet;
   a filter supply module provided within the body housing and configured to provide a filter sheet;
   a filter transportation module configured to transport the filter sheet from the filter supply module such that the filter sheet passes by the air inlet and is discharged at the filter discharge outlet; and
   a cutting module configured to cut the filter sheet transported by the filter transportation module, wherein the filter transportation module comprises:
   a drive supply roller and a driven supply roller that are arranged to face each other with the filter sheet between the drive supply roller and the driven supply roller, and the drive supply roller and the driven supply roller are configured to maintain contact with the filter sheet or to transport the filter sheet;
   a drive discharge roller and a driven discharge roller that are positioned a distance apart from the drove supply roller and the driven supply roller, respectively, that are arranged to face each other with the filter sheet between the drive discharge roller and the driven discharge roller, and that the drive supply roller and the driven supply roller are configured to maintain contact with the filter sheet or to transport the filter sheet;
   a first roller drive motor configured to drive the drive supply roller; and
   a second roller drive motor configured to drive the drive discharge roller, and the cutting module is positioned between the drive supply rollers and the drive discharge rollers.

2. The air cleaner of claim 1, wherein the body housing comprises:
   a body portion configured to dispose the drive supply roller and the drive discharge roller; and
   an upper covering portion configured to dispose the driven supply roller and the driven discharge roller.

3. The air cleaner of claim 1, wherein:
   the air inlet is disposed at a front surface of the body housing,
   a filter outlet disposed below the air inlet at the front surface of the body housing, and the filter outlet is configured to allow the filter sheet to be moved out,
   a filter inlet disposed above the air inlet at the front surface of the body housing, and the filter inlet is configured to allow the filter sheet to be inserted into the body housing, and
   the supply rollers and the discharge rollers are arranged a distance apart in a backward-forward direction behind the filter inlet.

4. The air cleaner of claim 1, wherein the filter supply module comprises:
   a sheet-winding roller having both end portions to be rotatably provided within the body housing, and the filter sheet is configured to be wound around the sheet-winding roller.

5. The air cleaner of claim 1, wherein the filter supply module is disposed below the air inlet.

6. The air cleaner of claim 1, wherein the driven supply roller is engaged with the drive supply roller with the filter sheet provided between the driven supply roller and the drive supply roller, and the driven supply roller is configured to be rotated together with the drive supply roller by rotation thereof.

7. The air cleaner of claim 1, wherein the driven discharge roller is disposed to face the drive discharge roller with the filter sheet provided between the driven discharge roller and the drive supply roller, and the driven discharge roller is configured to be rotated together with the drive discharge roller by rotation thereof.

8. The air cleaner of claim 1, wherein at least one roller of the driven supply roller and the driven discharge roller is configured to elastically move upward and downward by an elastic member.

9. The air cleaner of claim 1, wherein the first roller drive motor and the second roller drive motor are configured such that the first roller drive motor is individually operable from the second roller drive motor.

10. The air cleaner of claim 1, wherein the filter transportation module is disposed above the air inlet.

11. The air cleaner of claim 1, wherein the filter transportation module is configured to include an upper guide plate that faces a lower guide plate, and the filter sheet is configured to pass between the upper guide plate and the lower guide plate.

12. The air cleaner of claim 11, wherein a portion of the drive supply roller is to pass through a first roller through-hole at the lower guide plate and is exposed in an upward direction from the lower guide plate, and a portion of the drive discharge roller is to pass through a second roller through-hole at the lower guide plate and is exposed in the upward direction from the lower guide plate, and a portion of the driven supply roller is to pass through a first roller through-hole at the upper guide plate and is exposed in a downward direction from the upper guide plate, and a portion of the driven discharge roller is to pass through a second roller through-hole at the upper guide plate and is exposed in the downward direction from the upper guide plate.

13. The air cleaner of claim 1, wherein a concave-convex portion is disposed on an external circumferential surface of the drive supply roller, and the concave-convex portion is configured to maintain contact with the filter sheet.

14. The air cleaner of claim 1, wherein the drive supply roller comprises:
   a first roller portion having a concave-convex portion provided thereon; and
   a second roller portion in which a concave-convex portion is not provided thereon.

15. The air cleaner of claim 1, wherein the cutting module is disposed more adjacent to the drive supply roller than to the drive discharge roller.

16. The air cleaner of claim 1, wherein the cutting module comprises:
   a cutter configured to cut the filter sheet; and
   a cutter moving unit configured to move the cutter from a first lateral end of one section of the filter sheet up to a second lateral end thereof, the first lateral section of the filter sheet is to pass through the two supply rollers and the two discharge rollers.

17. The air cleaner of claim 1, further comprising:
   a controller configured to:
      control operation of each of the filter transportation module and the cutting module,
      control operation of the drive discharge roller and the drive supply roller at a same time and thus transport the filter sheet;
      control operation of the drive discharge roller and thus pull the filter sheet in a state where the drive supply roller is stopped when the filter sheet is transported;
      control operation of the cutting module and thus cut the filter sheet in a state where the filter sheet is to be pulled; and
      control operation of the drive discharge roller and thus discharge a cut-off section of the filter sheet.

18. The air cleaner of claim 1, wherein opposite end portions of at least one specific roller of the filter transportation module are rotatably supported on a roller housing,
   a first rotation center shaft and a first rotation center hole, which are rotation centers of the specific roller, are provided at a position where a first end portion of the specific roller and the roller housing correspond to each other,
   a second rotation center shaft and a second rotation center hole, which are the rotation centers of the specific roller, are provided at a position where a second end portion of the specific roller and the roller housing correspond to each other, and
   a shaft assembly including a movable body is provided on the second end portion of the specific roller, the second rotation center shaft being providing on a leading end of the movable body, and a position of the movable body varying such that the second rotation center shaft is moved into and out of the second rotation center hole.

19. The air cleaner of claim 18, wherein the first rotation center shaft comprises:
   a rotation section configured to contact an internal surface of the first rotation center hole and to be rotatably supported thereon, and
   a convergent section extending from the rotation section, wherein the nearer a leading end of the first rotation center shaft is, the smaller an external diameter of the convergent section.

20. A method of controlling operation of an air cleaner that includes a body housing having an air inlet and a filter discharge outlet, a fan module configured to be driven such that air is provided through the air inlet, a filter sheet configured to pass by the air inlet, a drive supply roller and a driven supply roller that are arranged to face each other, a drive discharge roller and a driven discharge roller that are arranged to face each other, and a cutting module configured to cut the filter sheet between the two supply rollers and the two discharge rollers, the method comprising:
   operating the drive discharge roller and the drive supply roller at a same time and configured to transport the filter sheet;
   operating the drive discharge roller and thus pull the filter sheet in a state where the drive supply roller is stopped after the operating of the drive discharge roller and the drive supply roller at a same time;
   operating the cutting module and configured to cut the filter sheet between the drive supply roller and the drive discharge roller after the operating of the drive discharge roller; and
   operating the drive discharge roller and configured to discharge a cut-off section of the filter sheet after the operating of the cutting module.

* * * * *